United States Patent [19]

Maguire, Jr.

[11] Patent Number: 5,734,421

[45] Date of Patent: Mar. 31, 1998

[54] APPARATUS FOR INDUCING ATTITUDINAL HEAD MOVEMENTS FOR PASSIVE VIRTUAL REALITY

[76] Inventor: Francis J. Maguire, Jr., 88 Greenwood Dr., Southbury, Conn. 06488

[21] Appl. No.: 452,510

[22] Filed: May 30, 1995

[51] Int. Cl.$^6$ .................. H04N 7/18; G09G 3/02
[52] U.S. Cl. .................. 348/121; 348/115; 345/8; 364/516; 364/410
[58] Field of Search .............. 345/7, 8, 9; 348/115, 348/113, 114, 117, 119, 121, 122, 123, 124; 434/40, 42, 43, 44, 35, 34; 364/410, 516, 424.013; 395/129, 135, 123, 125, 126; H04N 7/18

[56] References Cited

U.S. PATENT DOCUMENTS

| 2,168,566 | 8/1939 | Goldsmith . |
| 2,955,156 | 10/1960 | Heilig . |
| 3,050,870 | 8/1962 | Heilig . |

(List continued on next page.)

FOREIGN PATENT DOCUMENTS

| 0655640 | 5/1995 | European Pat. Off. . |
| 4215523 | 1/1993 | Germany . |
| 556924 | 3/1993 | Japan . |
| 5211625 | 8/1993 | Japan . |
| 2272124 | 5/1994 | United Kingdom . |

OTHER PUBLICATIONS

News Release, No. 14, 1994, "Telepresence Research Creates 'Virtual Brewery Adventure'" to immerse visitors in Sapporo Beer, Portola Valley, California.

Fakespace Labs BOOM 3C, product description dated 9 Feb. 1994.

"Warning: Today's Museum Tour May Result in a Virtual Hangover" by David P. Hamilton, The Wall Street Journal, Oct. 7, 1994.

"Video See–through Design for Merging of Real and Virtual Environments", E.K. Edwards, et al, IEEE Virtual Reality Annual International Symposium, Sep. 18–22, 1993, Seattle, Washington, pp. 223–233.

"Merging Virtual Objects with the Real World: Seeing Ultrasound Imagery within the Patient" M. Bajura, et al Computer Graphics Proceedings, vol. 26, No. 2, Jul. 1992 pp. 203–210.

Computer Graphics Proceedings, vol. 26, No. 2, Jul. 1992 pp. 203–210.

"High–Resolution Inserts in Wide–Angle Head–Mounted Stereoscopic Displays", E.M. Howlett, et al, SPIE vol. 1669 Stereoscopic Displays and Applications III (1992), pp. 193–203.

"Proposal for a Large Visual Field Display Employing Eye Tracking" H. Yamaguchi, et al., SPIE vol. 1194, Optics, Illumination, and Image Sensing for Machine Vision IV (1989) pp. 13–20.

"A head–mounted three dimensional display," Ivan E. Sutherland, 1968, Fall Joint Computer Conference.

"A Review and Investigation of Aiming and Tracking Performance with Head–Mounted Sights," Wells and Griffin, IEEE Trans. on Systems, Man, and Cybernetics, vol. SMC–17, No. 2, Mar./Apr. 1987.

"Effortless computing: the eyes have it", Science, Apr. 1986, p. 12.

(List continued on next page.)

Primary Examiner—Michael H. Lee

[57] ABSTRACT

A helmet with a helmet mounted display (HMD) is attitudinally controlled in a framework for moving the head of a passive viewer wherein the helmet mounted display is for viewing images that are emulative of images viewed by a cameraman with head mounted cameras whose head attitude is monitored for controlling the helmet. Additionally, the viewer's eyes may be induced to follow a sequence of visual fixations at the same time as the passive viewer's head is induced to execute attitudinal movements consistent therewith.

12 Claims, 12 Drawing Sheets

5,734,421

U.S. PATENT DOCUMENTS

| | | |
|---|---|---|
| 3,113,180 | 12/1963 | Bingley et al . |
| 3,234,327 | 2/1966 | McMann . |
| 3,336,587 | 8/1967 | Brown . |
| 3,379,833 | 4/1968 | Hecker et al. . |
| 3,379,885 | 4/1968 | Nork . |
| 3,450,466 | 6/1969 | Streisinger . |
| 3,462,604 | 8/1969 | Mason . |
| 3,473,868 | 10/1969 | Young et al. . |
| 3,507,988 | 4/1970 | Holmes . |
| 3,542,457 | 11/1970 | Balding et al. . |
| 3,576,945 | 5/1971 | Ebeling . |
| 3,593,286 | 7/1971 | Altman . |
| 3,663,098 | 5/1972 | Merchant . |
| 3,712,716 | 1/1973 | Cornsweet et al. . |
| 3,746,782 | 7/1973 | Driskell . |
| 3,786,458 | 1/1974 | Horner et al. . |
| 3,850,511 | 11/1974 | Merchant . |
| 3,864,030 | 2/1975 | Cornsweet . |
| 3,869,694 | 3/1975 | Merchant et al. . |
| 3,883,235 | 5/1975 | Lynn et al. . |
| 3,917,412 | 11/1975 | Stoutmeyer et al. . |
| 3,953,111 | 4/1976 | Fischer et al. . |
| 4,028,725 | 6/1977 | Lewis . |
| 4,034,401 | 7/1977 | Mann . |
| 4,048,653 | 9/1977 | Spooner . |
| 4,109,145 | 8/1978 | Graf . |
| 4,189,744 | 2/1980 | Stern . |
| 4,190,332 | 2/1980 | Body et al. . |
| 4,197,855 | 4/1980 | Lewin . |
| 4,199,785 | 4/1980 | McCullough et al. . |
| 4,209,255 | 6/1980 | Heynau et al. . |
| 4,231,066 | 10/1980 | Merchant . |
| 4,246,605 | 1/1981 | La Russa . |
| 4,283,177 | 8/1981 | Kron et al. . |
| 4,303,394 | 12/1981 | Berke et al. ................................ 437/40 |
| 4,315,240 | 2/1982 | Spooner . |
| 4,315,241 | 2/1982 | Spooner . |
| 4,348,186 | 9/1982 | Harvey et al. ............................ 434/44 |
| 4,349,815 | 9/1982 | Spooner . |
| 4,375,674 | 3/1983 | Thornton . |
| 4,405,943 | 9/1983 | Kanaly . |
| 4,513,317 | 4/1985 | Ruoff, Jr. . |
| 4,516,157 | 5/1985 | Campbell . |
| 4,559,555 | 12/1985 | Schoolman . |
| 4,561,448 | 12/1985 | Buchas . |
| 4,586,515 | 5/1986 | Berger . |
| 4,672,438 | 6/1987 | Plante et al. . |
| 4,757,380 | 7/1988 | Smets et al. . |
| 4,819,064 | 4/1989 | Diner . |
| 4,823,271 | 4/1989 | Clark et al. . |
| 4,853,764 | 8/1989 | Sutter . |
| 4,967,268 | 10/1990 | Lipton et al. . |
| 4,979,033 | 12/1990 | Stephens . |
| 4,982,278 | 1/1991 | Dahl et al. . |
| 5,049,988 | 9/1991 | Sefton et al. . |
| 5,072,218 | 12/1991 | Spero et al. . |
| 5,125,733 | 6/1992 | Lee . |
| 5,130,794 | 7/1992 | Ritchey . |
| 5,175,616 | 12/1992 | Milgram et al. . |
| 5,245,371 | 9/1993 | Nagano et al. . |
| 5,252,950 | 10/1993 | Saunders et al. . |
| 5,296,888 | 3/1994 | Yamada . |
| 5,363,241 | 11/1994 | Hegg et al. . |
| 5,365,370 | 11/1994 | Hudgins . |
| 5,394,517 | 2/1995 | Kalawsky ................................ 395/129 |
| 5,423,215 | 6/1995 | Frankel ...................................... 73/386 |
| 5,455,654 | 10/1995 | Suzuki . |
| 5,615,132 | 3/1997 | Horton et al. . |

OTHER PUBLICATIONS

"Stereo Eye Movement," Davi Geiger and Alan Yuille, Jan. 1988, MIT Artificial Intelligence Laboratory, AI Memo No. 927.

"Image Focusing In Space and Time," M.W. Siegel, CMU-RI-TR-88-2 Intelligent Sensors Lab, The Robotics Institute, Carnegie Mellon University, Feb. 1988.

"A Three Dimensional Electronic Retina Architecture," G. Salada, MSEE Thesis, U.S. Air Force Institute of Technology, Dec. 1987, AFIT/GCS/ENG/87D-23.

T. Caudell et al, "Augmented reality: An application of heads-up display technology to manual manufacturing processes", Proc. Hawaii Int'l Conf. System Sciences, pp. 659-669, Jan. 1992.

M. Deering, "High resolution virtual reality", Computer Graphics (Proc. SIGGRAPH Conf.), vol. 26, No. 2, pp. 195-202, Jul. 1992.

M. Gleicher, et al, "Through-the-lens camera control", Computer Graphics (Proc. SIGGRAPH Conf.), pp. 331-340, Chicago IL, Jul. 1992.

P. Wellner, "Interacting with paper on the digital desk", Comm. ACM, vol. 36, No. 7, pp. 87-96, Jul. 1993.

A. Janin et al, "Calibration of head-mounted displays for augmented reality applications", Proc. Virtual Reality Ann. Int'l Symp. (VRAIS '93), pp. 246-255, Sep. 1993.

S. Feiner, et al, "Knowledge-based augmented reality", Comm ACM, vol. 36, No. 7, pp. 53-62, Jul. 1993.

P. Milgram et al, "Applications of augmented reality for human-robot communications", Proc. IROS '93: Int'l Conf. Intelligent Robots and Systems, pp. 1,467-1,472, Yokohama, Jul. 1993.

"Autocalibration for Virtual Environments Tracking Hardware" by S. Gottschalk, et al, Computer Graphics Proceedings, Annual Conference Series, 1993, pp. 65-72.

"ARGOS: A Display System for Augmenting Reality" by D. Drascic et al, Formal Video Programme and Proc. Conf. Human Factors in Computing Systems (Interchi '93), Apr. 24-29, 1993, Amsterdam, p. 521.

APPARATUS FOR INDUCING ATTITUDINAL HEAD MOVEMENTS FOR PASSIVE VIRTUAL REALITY

TECHNICAL FIELD

This invention relates to providing images and, more particularly, to providing successive images to a passive viewer.

BACKGROUND OF THE INVENTION

Still photography, motion pictures and television were influenced by the way artists represented physical reality in paintings, as if through a window. A highly detailed perspective image is provided, typically within a rectangular frame. All provide highly detailed images which induce the viewer to cooperate with the cameraman's "vision" by assuming the artificial perspective of the representation. The viewer is enabled to deliberately suspend disbelief that the images themselves are not a real object space. The degree to which the viewer is thus enabled is influenced not only by the image resolution but by the field of view. It is usually thought desirable to increase both. For example, very high resolution commercial television standards have been formulated for increasing image quality. Such approaches typically increase the number of horizontal lines scanned to a number significantly greater than present standards. Larger format movie film such as 70 mm has been used to increase detail. Also, panoramic movies, e.g., "Cinerama" increased the field of view to increase realism. Various stereoscopic television approaches have also been conceived or developed to increase realism.

All of these traditional media take a rather objective view of the physical world. The image is framed by a window through which the viewer can gaze in any direction "into" a representation of an object space. Events are presented in both movies and television in a series of different action scenes in a story line which the viewer can observe from a stable and seemingly quasi-omniscient point of view. The viewer is led to take what appears to be a view of the world as it really is. Yet the choice of image and its perspective is picked by the creator of the image and the viewer actually assumes a passive role.

A sensorama simulator was disclosed by Heilig in U.S. Pat. No. 3,050,870. The senses of an individual were stimulated to simulate an actual experience realistically with images, a breeze, odors, binaural sound and even motion. Heilig also disclosed a stereoscopic television in U.S. Pat. No. 2,955,156. This also was passive.

"Virtual reality," in an electronic image context, goes even further in the direction of increased realism but enables the viewer to take a more active role in selecting the image and even the perspective. It means allowing a viewer's natural gestures, i.e., head and body movements, by means of a computer, to control the imaged surroundings, as if the viewer were seeing and even moving about in a real environment of seeing, hearing and touching. Due to the myriad of possible actions of the viewer, a corresponding multiplicity of virtual activities needs to be available for viewer choice. This would represent the ultimate in artificial experience.

But the creation of many possible scenarios for viewer selection creates a massive demand for electronic image storage space and there is also the problem of a disconcerting time lag between the viewer's action and the response of the imaging system. These problems make this emerging technology hard to achieve using presently available hardware. The software task is equally daunting.

DISCLOSURE OF INVENTION

The object of the present invention is to provide a new method and means of presenting images in succession.

According to a first aspect of the present invention, images simulative of active percepts, that is, images actively sensed by one or more cameras associated with a first person, for example, on the head of the first person, or images simulative thereof, are provided, according to a second aspect of the invention, for passive perception by a second person whose head movements are controlled by virtue of being inside a motion-controlled helmet that is actuated in such a way as to emulate head movements of the first person in synchronism with the actively sensed images. The "first person," if there is such, can but need not have one or more cameras mounted on his head and the direction of his head with respect to a selected reference frame is monitored and head monitoring signals are stored in association with individual images picked up by the head-mounted camera or cameras. Such images are provided "live" or are played back to the second person by way of a display fixed on a structure outside the helmet or by way of a headup display fixed to the helmet. The motion of the helmet is controlled with respect to the individual images by retrieving the previously stored head monitoring signals in synchronization therewith. The head of the second person is urged by the controlled movements of the helmet to execute head movements emulative of the monitored motions of the first person at the time of image acquisition.

Simulated active percepts, according to the present invention, permit a viewer to experience percepts as if inside the head of another person. This is so because even though the images presented to the second person may be panning rapidly about and changing perspective at the whim of the "first person" cameraman, the "second person" passive viewer has those images presented to his eyes while his head is also forced to move in the same direction as that of the first person's head so that it is directionally coordinated with the images viewed by the cameraman, as if he were viewing them himself, through his own eyes.

It should be realized that cameras are not needed and the images can be created by means of a computer or even by known animation techniques. In that case the head movements can be preplanned rather than sensed.

There can of course be a large number of "second" persons (viewers) with their own motion-controlled helmets or "second-hand experience simulators," e.g., in the form of self-contained booths each with a multi-degree of freedom helmet for connection within. The viewer's helmet may be actuated in any number of degrees of freedom as a matter of design choice to exert some minimum degree of head control with just a few actuators or can provide a full complement of actuators, e.g., providing control in six or even more axes. A booth can be for home or arcade use, for example. Such a "second" person enters the booth, sits down and puts his head inside the helmet, which may be insertable or dangling from the inside top ceiling of the booth. A chin strap may be secured. The display may be a panoramic display fixed in the wall of the booth or may be a helmet mounted display as known in the art.

The invention may be made even more like a re-experience of a first person's experiences, according further to the present invention, by effectively controlling eye movements of the second person in such a way as to be emulative of eye movements of the first person. This can be done in a nonintrusive way by presenting nonuniform images emulative of the human fovea, e.g., with nonuniform resolution, nonuniform dynamic range, a small colored area in an otherwise wide-field black and white image, nonuniform image informational content, nonuniform image concentration, nonuniform brightness, or some other equivalent nonuniform images to the second person so as to draw the second person's attention to an area of high resolution, high dynamic range, or the like, wherein such area moves about as between successive images presented within the field of view of the second person. In this way, not only the head of the second person has its motions controlled but the eye movements are "controlled" as well. So the second person can have his head controlled to be directed in one direction while the attention of his eyes is drawn or directed in another direction. In this way, the second person feels even more like he is undergoing experiences of another, i.e., the first person. Such images can be created by monitoring one or both eyes of the "first" person (cameraman) and causing the image information gathered by the cameras to be encoded in a nonuniform way such as by having finer scanning in a small area dictated by where the cameraman happens to be looking at a given moment with the rest of the field scanned coarsely.

The simulated active percepts may be presented "live" or may be stored and retrieved from storage and later presented for passive perception. The booth can be provide with a video cassette recorder to playback the image and helmet control information.

In the case of stored simulated active percepts, according to the teachings hereof, since there is only one set of images to store, the massive memory demand problem of the prior art of "virtual reality" is solved. Similarly, for the "live" case, since the simulated active percept is provided as created there is no storage requirement at all.

Moreover, by providing simulated active percepts for passive perception, there is no longer any time lag or latency problem as is presently the case for known virtual reality applications. Since the simulated active percepts induce the viewer to emulate those physical actions which caused or would have caused the simulated active percepts, the hardware need not be faster or as fast as the viewer. In fact, it may be much slower. Although the viewer is relegated to a passive role, the novelty and richness of the virtual reality experience more than compensates in opening a whole new world of opportunity for representing reality.

These and other objects, features and advantages of the present invention will become more apparent in light of a detailed description of a best mode embodiment thereof which follows, as illustrated in the accompanying drawing.

BEST MODE FOR CARRYING OUT THE INVENTION

Figure 1:
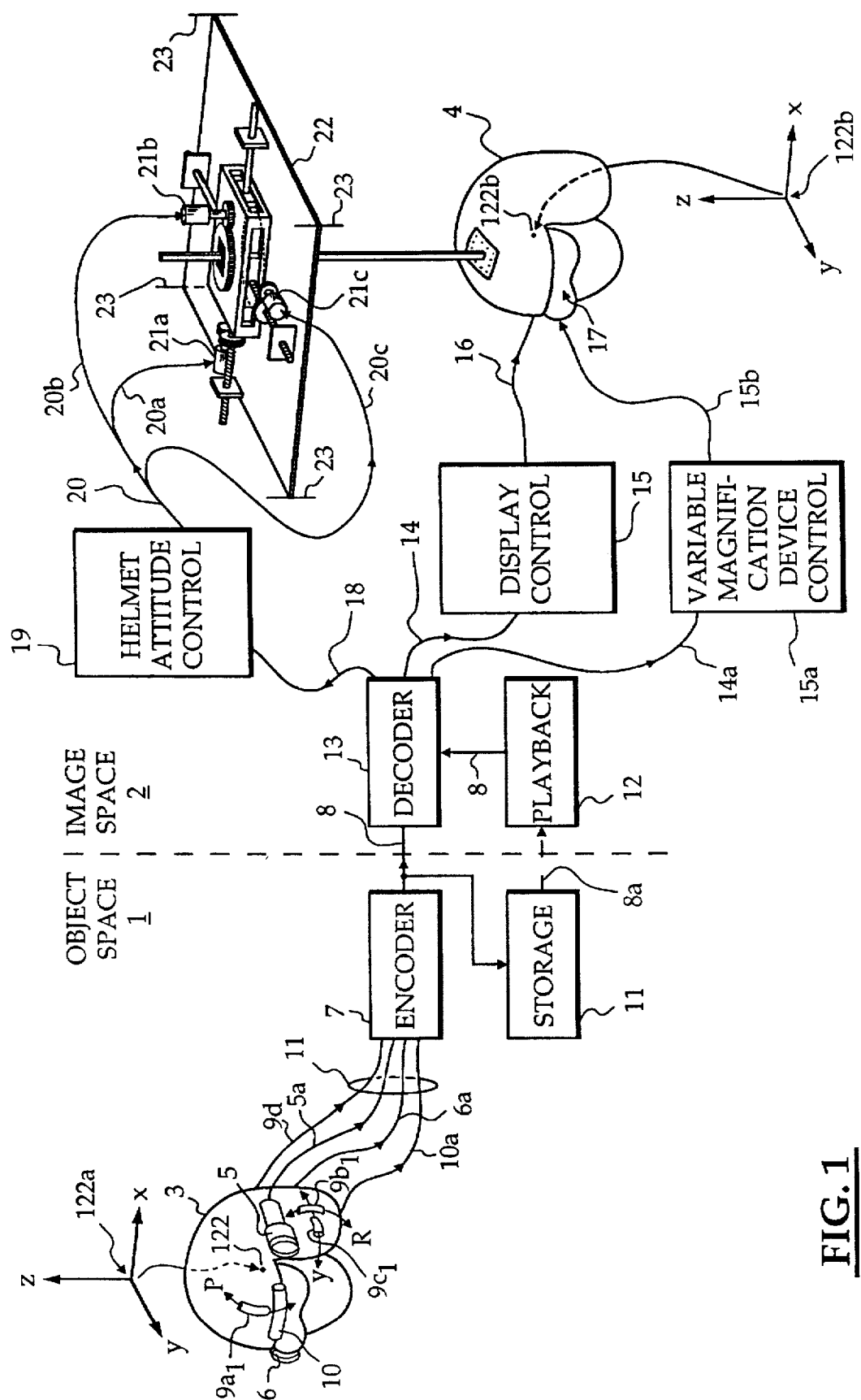
FIG. 1, according to a first aspect of the present invention, shows a helmet for a cameraman in an object space having at least one camera and various sensors for at least monitoring head attitude and a signal processor or encoder for providing an encoded signal to a decoder, according to a second aspect of the invention, in an image space where decoded signals are provided to a helmet attitude control and to a display control for providing actuator control signals to at least a helmet attitude actuator mounted in a frame such as an arcade booth and to a helmet mounted display.

FIG. 1 shows an object space 1 and an image space 2, each of which may have respective helmets 3, 4 therein, or their equivalents, according to the present invention. The image space is for presentation of images to a "viewer" while the object space is for image acquisition, e.g., by an "observer." The linguistic convention of calling the active creator of the image the "observer" in the "object" space and the passive consumer of the created image in the "image" space as the "viewer" will be used throughout.

According to the present invention, the helmet 4 in the image space 2 is worn by a passive viewer (not shown) seated within a stationary arcade-like housing (not shown) with respect to which the helmet 4 is made to move. It is made to execute at least some minimum movement such as one or more attitudinal movements emulative of pitch, roll and yaw movements of the helmet 3 in the object space 1 and worn by a cameraman observer (not shown) who is free to move about while directing his head and gaze in various directions. In other words, translatory movements of the head of the observer with respect to some referent may, but need not be, emulated by the helmet of the viewer. For the detailed embodiment shown below, however, only the attitude of the cameraman's head is emulated. Translations are ignored. This makes it possible for the preferred embodiment shown for the viewer's body to remain stationary (not be forced to undergo various translatory accelerations) in the image space. Otherwise, additional sets of external platforms and associated superstructures would be required depending on the number of axes of control. For the case shown where only head attitude is emulated, the viewer can be seated or standing in one position within a stationary structure.

At the same time, a helmet mounted display 17, to be described below, mounted on the helmet 4, provides images to the passive viewer wearing the helmet 4 that are gathered by the cameraman in the object space 1 wearing the helmet 3 with cameras mounted thereon. The images viewed by the passive viewer in the image space are therefore presented in such a way as to be emulative of images seen by the cameraman as he moves his head, at least attitudinally, in the object space. It should be realized that translational position of the observer's head can be monitored in the object space as well, with respect to a selected referent, and such translations can be emulated by the helmet 4 in the image space by means of the already mentioned additional platforms and associated superstructures (not shown and not presently claimed).

The helmet 3 in the object space 1 has at least one camera 5, and preferably a second camera 6 as well, mounted on opposite sides of the helmet 3 for respectively gathering monocular or preferably stereoscopic images of objects in the object space according to the cameraman's head movements. The cameras provide image signals on lines 5a, 6a to an signal processor or encoder 7 where they are encoded for transmission to the image space 2 via a signal on a line 8.

Figure 2:
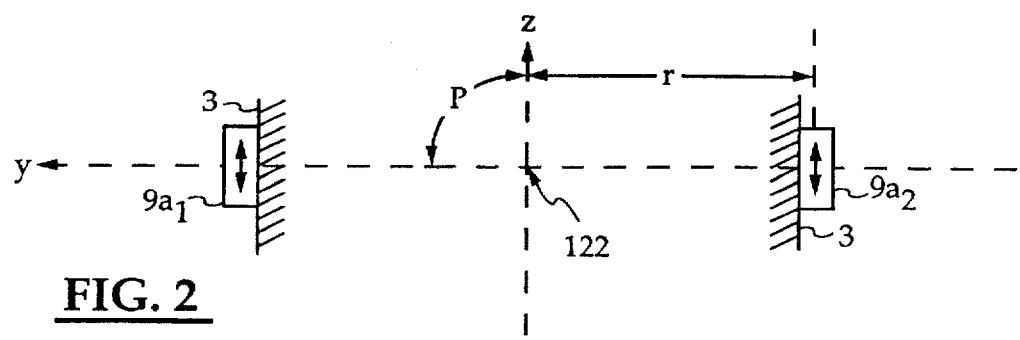
FIG. 2 shows one of the three attitude sensing planes of FIG. 1 for sensing pitch attitude of the cameraman's head, according to the invention.

Also illustrated mounted on the helmet 3 are helmet attitude sensors $9a_1$, $9b_1$, $9c_1$ such as, but not limited to, accelerometers for monitoring the cameraman's head attitude, i.e., its (a) pitch (P), (b) roll (R) and (c) yaw (Y). Opposite on the helmet to each of the illustrated sensors $9a_1$, $9b_1$, $9c_1$ may be located corresponding twin sensors $9a_2$, $9b_2$, $9c_2$ (not shown in FIG. 1) for sensing equidistantly on opposite side of the helmet. For example, as shown in FIG. 2, the pitch sensor $9a_1$ on the front of the helmet 3, e.g., just above the visor, may have a corresponding twin pitch sensor $9a_2$ (not shown in FIG. 1) on the back of the helmet opposite to the sensor $9a_1$. These two sensors are shown in FIG. 2 located on positive and negative equally spaced sides of a y-axis in a y-z plane of a three-axis (x,y,z) coordinate system (having three such mutually orthogonal planes) having an origin centered on the head of the observer at a point 122. Such a three axis system is illustrated with an origin 122a, for purposes of clarity, above the helmet 3 of FIG. 1 but it should be understood that it is most convenient to position the origin of the illustrated coordinate system at the point 122 at the center of the cameraman's head, as shown. Of course, the origin can be located at any convenient point and translated as desired by appropriate coordinate translations and transformations.

In any event, the two sensed pitch signals from the accelerometers $9a_1$, $9a_2$ of FIG. 2 may be used together to be indicative of pitch (P) rotations in the y-z plane about the point 122 midway between them, e.g., in the center of the cameraman's head. It should be realized, however, that a single sensor can suffice. Similarly, twin roll and yaw sensors may be positioned at equal distances apart (in corresponding mutually orthogonal roll and yaw sensing planes) on opposite sides of the helmet for sensing roll and yaw motions about substantially the same center point 122. For example, as shown in the object space of FIG. 1, the roll acceleration sensor $9b_1$ may be positioned as shown on the helmet over left ear of the observer and oriented as shown on a positive side of the x-axis while a not shown acceleration sensor $9b_2$ may be similarly positioned over the right ear of the observer on the other side of the helmet on a negative side of the x-axis. Together, they may be used inter alia to measure rotations in the x-z axis about the point 122 in the center of the cameraman's head. Similarly, the acceleration sensor $9c_1$ of FIG. 1 may be positioned over the left ear of the observer and oriented as shown in FIG. 1 on the positive x-axis with a not shown acceleration sensor $9c_2$ similarly positioned over the right ear of the observer on the other side of the helmet on the negative x-axis. Together, they may be used intra alia to measure rotations in the x-y axis about the point 122. It should be realized that it is also possible to monitor the attitude of the cameraman's head with any appropriate sensor with respect to another referent, such as but not limited to his body.

The sensors need not be accelerometers but could be gyros of the electromechanical type, SAGNAC effect fiber optic gyros, or conceivably even more bulky laser gyros. Other types of attitude sensors based on magnetic sensors or light beam sensors are known and are of course useable as well, as will be understood by those of skill in the art.

It should be realized that although FIG. 1 shows the image creation process as taking place in an "object" space 1 by means of a camera on a helmet gathering images of real objects and mounted on a helmet, similar images can be created in other ways, e.g., by animation or successive images created on computers, using software.

In any event, as shown in FIG. 1, the sensed attitude signals may altogether be provided on an illustrative line 9d to the signal processor or encoder 7 for being encoded along with the image signals on the lines 5a, 6a. They may be combined, for example, using time division multiplexing techniques or by any other convenient technique. Or the signal processor or encoder can calculate the attitude of the cameraman's head based on the sensed signals in the object space and encode appropriate actuator signals for transmission to the image space. It should be realized, however, that the helmet attitude and image signals need not be processed and combined into a single signal on the line 8, but may be processed and provided separately. Each of the acceleration signals may be separately processed in the signal processor or encoder 7 to provide an indication of angular displacement in each of the separate pitch, roll and yaw axes. For example, the pitch axis may, but need not, be defined in the y-z plane shown by the x-y-z axes of FIG. 1 centered at the point 122 in the object space of FIG. 1. Similarly, the yaw axis may, but need not, be defined in the x-y plane and the roll axis in the x-z plane.

Figure 3A:
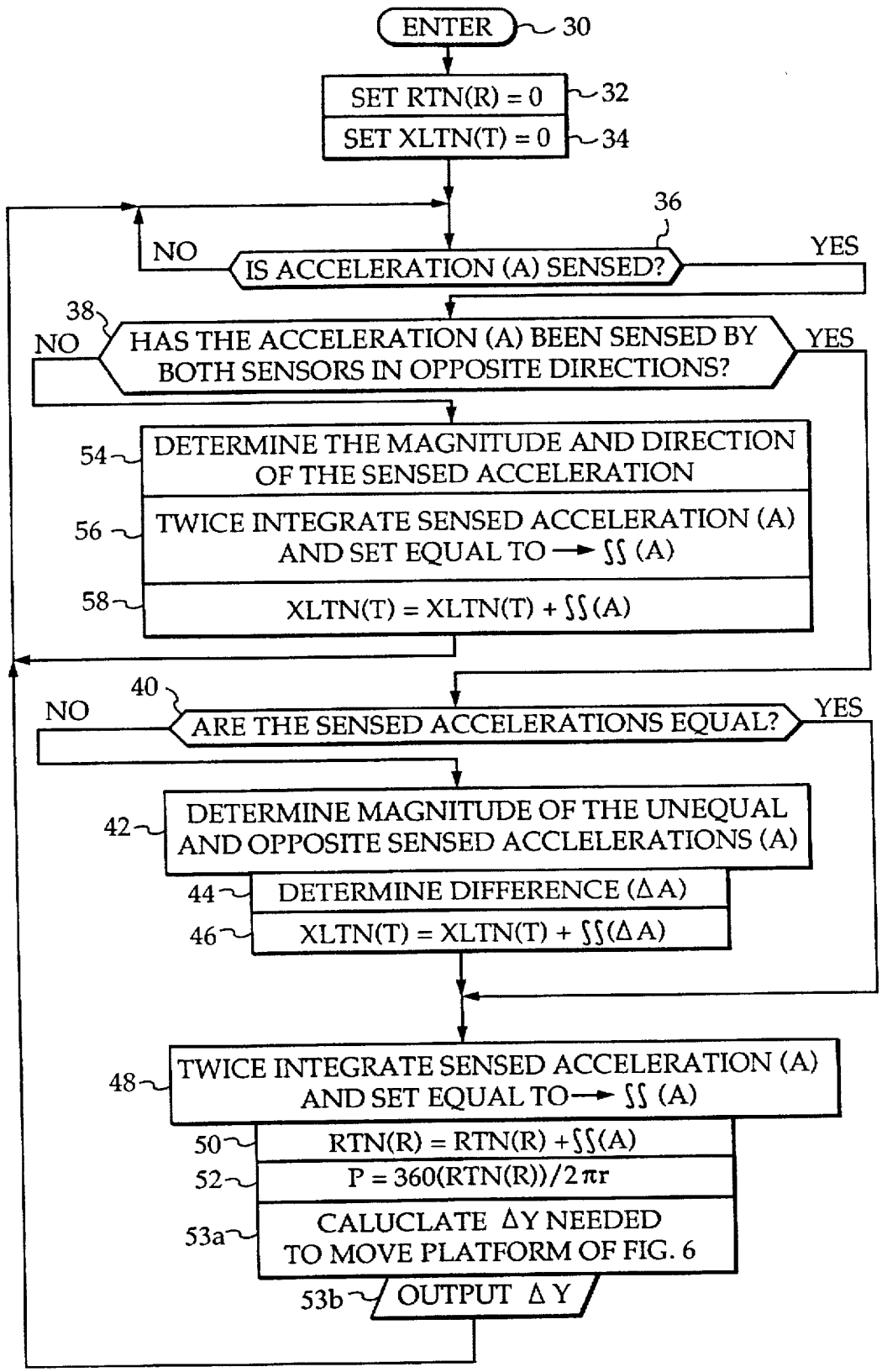
FIG. 3A shows a series of steps which may be carried out by the encoder of FIG. 1 prior to encoding the pitch control information for subsequent use in the image space, according to the invention.

FIG. 3A shows a signal processing method which may be used for evaluating the sensed acceleration signals to determine the cameraman's head attitude in the y-z (pitch) plane of FIGS. 1 & 2. Though not shown, a similar signal processing method may be used for evaluating the sensed acceleration signals in the x-z (roll) and x-y (yaw) planes. At the outset, it should be realized that other equally effective coordinate systems (such as polar coordinate systems) and methods may be used and the following is just one example.

According to FIG. 3A, after entering in a step 30, a pair of initialization steps 32, 34 are executed to set a rotation variable RTN(R) and a translation variable XLTN(T) equal to zero at a selected cameraman reference attitude and position, e.g., standing erect and head pointing straight-ahead. For this example, the variable XLTN(T) represents the position of the point 122 with respect to the z axis of FIGS. 1 or 2.

After initialization, a decision step 36 is executed to determine if acceleration (A) has been sensed by the accelerometers $9a_1$, $9a_2$ of FIG. 2. If not, then the step 36 is re-executed until such is sensed. Due to their bidirectionality and orientation in the z direction, both sensors will sense an acceleration along the z axis whether it be positive or negative. Once acceleration is sensed, a step 38 is executed to determine if a rotational acceleration is sensed by the accelerometers or not. I.e., if the accelerometers sense translations in opposite directions at the same time, this is interpreted as sensing a rotation.

If a rotation has been sensed, a decision step 40 is executed to determine if the sensed rotation is a pure rotation in the y-z plane about the point 122 or if it is accompanied by a translation of the point 122 in the z direction. It can do this by comparing the absolute magnitudes of the oppositely sensed accelerations of the two sensors $9a_1$, $9a_2$. If they are equal then they represent a pure rotation. If not, then there is also a translation present in the positive or negative direction.

In the case where they are not equal, a step 42 may be executed to determine the magnitude of the equal and opposite sensed accelerations that are together indicative of the magnitude of the arc of rotation and its direction. The equal but opposite accelerations will either both indicate a clockwise rotation or a counterclockwise rotation. For instance, if sensor $9a_1$ indicates an acceleration in the positive z direction and sensor $9a_2$ indicates an acceleration in the negative z direction then the rotation is in the clockwise direction.

If knowledge of translations is desired, the step 42 can be executed to determine the magnitudes of the two oppositely sensed accelerations and then, in a step 44, to determine the part of one of the sensed accelerations that exceeds the other, i.e., to determine the difference ($\Delta A$) between the sensed accelerations. The difference can then be integrated twice to determine the length of the translation and summed with the previous value of XLTN(T), as indicated in a step 46, to indicate the current z position. Such knowledge may be needed for instance in all three orthogonal planes where it is desired to keep track of the three dimensional translatory position of the head of the cameraman. Such is not used in the present application but it could be used in other applications.

In a step 48, executed subsequent to either the translation update step 46 or the decision step 40, the sensed acceleration (A) (that is equal in terms of absolute value in both sensors) is twice integrated to determine the length of arc of rotation of the movement of the cameraman's head about the point 122. The doubly integrated acceleration is summed in a step 50 with the previous value of the pitch rotation value RTN(R). Since the radius (r) from the point 122 to each of the accelerometers is known and since the arc of rotation is known from the foregoing, the angle of rotation in the y-z plane can be determined. I.e., if the radius (r) of a circle is known, the length of an arc (a=RTN(R)) on the circumference can be used to measure the corresponding angle (P) at the center. Consequently, the pitch angle (P) can be determined in degrees as shown in a step 52 according to the relation $2(\pi)r/RTN(R)=360/P$. At this point, as described in more detail below, calculation of the necessary movement of the platform 84 of FIG. 6A in the y direction can be made and output for encoding with the video signal as indicated in steps 53a, 53b.

The step 36 is then re-executed to determine if additional accelerations have been sensed. Once again, if no additional accelerations have been sensed then the step 36 is executed again ad infinitum until an acceleration is sensed. At that time, the decision step 38 is executed to determine if there has been a rotation.

If it is important to determine translations in the y-z plane, a step 54 may be executed after the step 38 to determine the magnitude and direction of the acceleration (A) from the sensors $9a_1$, $9a_2$. A step 56 is next executed in order to twice integrate the sensed acceleration (A). This determines a pure translation which is added in a step 58 to the previous value of the translation variable XLTN(T). A return is then made to the step 36 to determine if additional accelerations have been sensed. Once again, if no additional accelerations have been sensed then the step 36 is executed again ad infinitum until an acceleration is sensed. At that time, the decision step 38 is executed to determine if there has been a rotation.

As mentioned, a similar signal processing method as shown in FIG. 3A may be executed at the same time (serially or in parallel) for evaluating the sensed acceleration signals in the x-z (roll) and x-y (yaw) planes. These various signal processing procedures may be carried out as shown in FIG. 3A by means of the signal processor or encoder 7 of FIG. 4. As also mentioned, for the embodiment shown, translations need not be tracked. Here, it is desired to "divorce" attitudinal motions of the cameraman's head from translations thereof because of the stationary nature of the structure 23 with respect to which the body of the viewer in the image space is also relatively stationary. In other words, for the preferred embodiment, it is not desired to positively translate the head or body of the viewer in the image space. So, for the illustrated embodiment, the steps 44, 46, 54, 56, 58 may be omitted. I.e., if the answer to the question posed in the decision step 38 is negative, then the step 36 may be re-executed directly and steps 54, 56, 58 may be omitted completely from the procedure.

Figure 4:
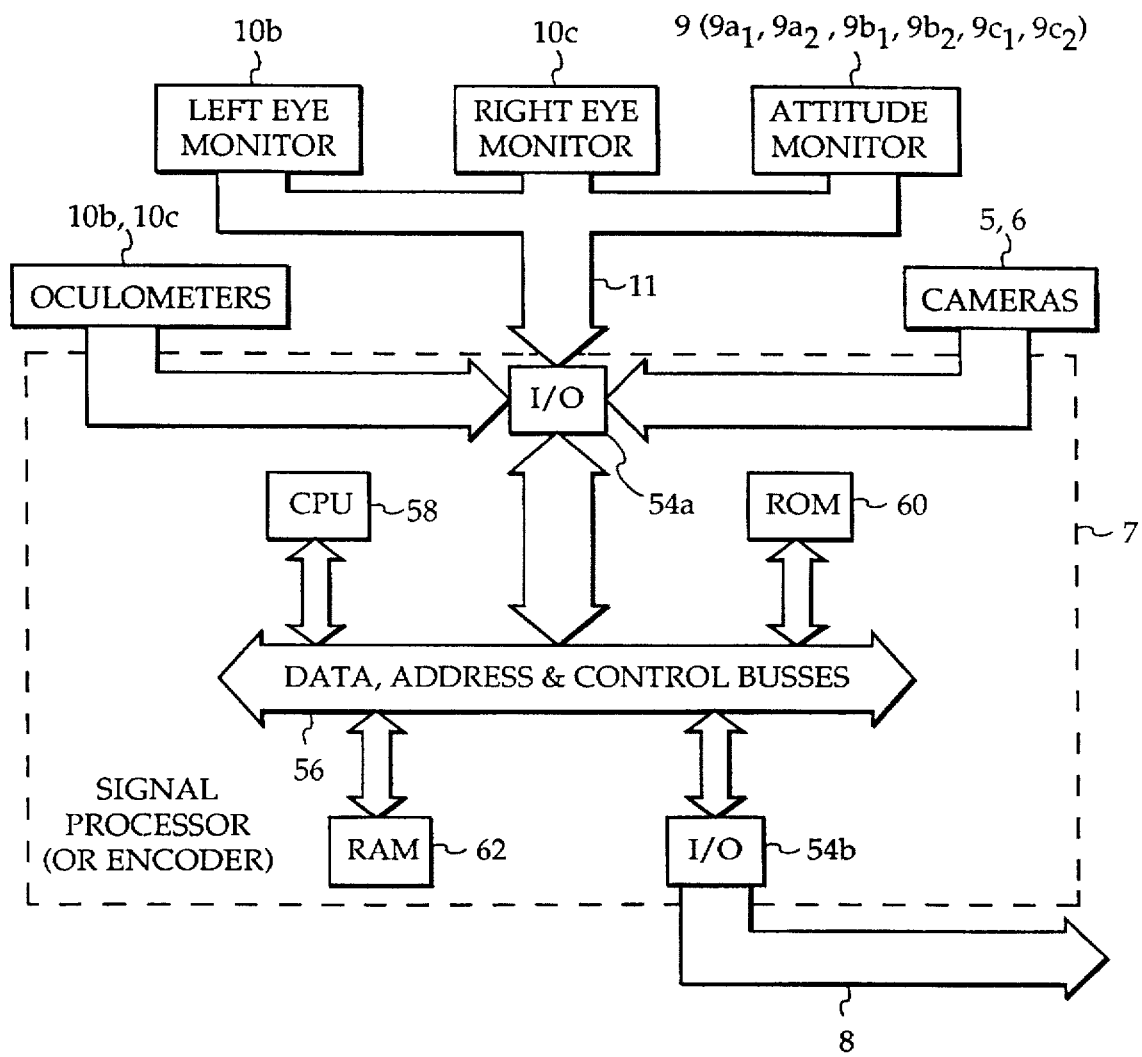
FIG. 4 shows more details of the relation between the sensors and encoder in the object space of FIG. 1, according to the invention.

FIG. 4 shows the signal processor or encoder 7 of FIG. 1 as a general purpose signal processor capable of carrying out the steps of FIG. 3A. It may include an input/output (I/O) device 54 which may be represented in part by a device 54a for interfacing with the attitude monitor 9 which may, but need not, include the accelerometers $9a_1$, $9a_2$, $9b_1$, $9b_2$, $9c_1$, $9c_2$, a left eye monitor 10b, and a right eye monitor 10c. It may also include various data, address and control busses 56 for interfacing with a central processing unit (CPU) 58, one or more memory devices which may include a read-only-memory 60 and a random access memory (RAM) 62. The I/O device 54 may also be represented in part by a device 54b for interfacing with the image space 2 over the line 8.

Referring to both FIGS. 1 and 4, an additional sensor 10 or pair (10b, 10c) of sensors may also, but need not, be provided in the form of one or two eye attitude or direction monitors such as a pair of left and right oculometers 10b, 10c as shown in FIG. 4. Such a pair of oculometers are capable of monitoring the eyes' attitudes or directions and providing a monitored signal such as shown on a line 10a which could also represent two such signals, one for each of the cameraman's eyes. The device 10 of the illustrated eye direction sensor, for one or both eyes, can for example take the form of an infrared source for illuminating the cameraman's eye which reflects the infrared light into a directionally sensitive infrared sensor inside the helmet (not shown) for sensing the direction of eye movement. Such is shown for example in U.S. Pat. No. 4,034,401, among many others. It should also be realized that other types of eye monitoring methods may be used as well, and further that it is not necessary to monitor eye attitude at all. Eye attitude is chiefly useful, according to the present invention, for providing a control signal for controlling an area of image nonuniformity such as an area of high resolution, dynamic range, brightness, or the like, in the images displayed to the passive viewer. It may not be necessary in some applications to have such a control signal (and consequently no eye monitoring) since uniform images can certainly be used. Equally, it should be realized that eye attitude, if monitored, can be monitored in any number of axes of eye attitude, including not only pitch and yaw but roll, i.e., torsion, and could even include, beyond attitude, position monitoring, although torsion and position monitoring are currently deemed not necessary for a preferred embodiment.

Figure 3B:
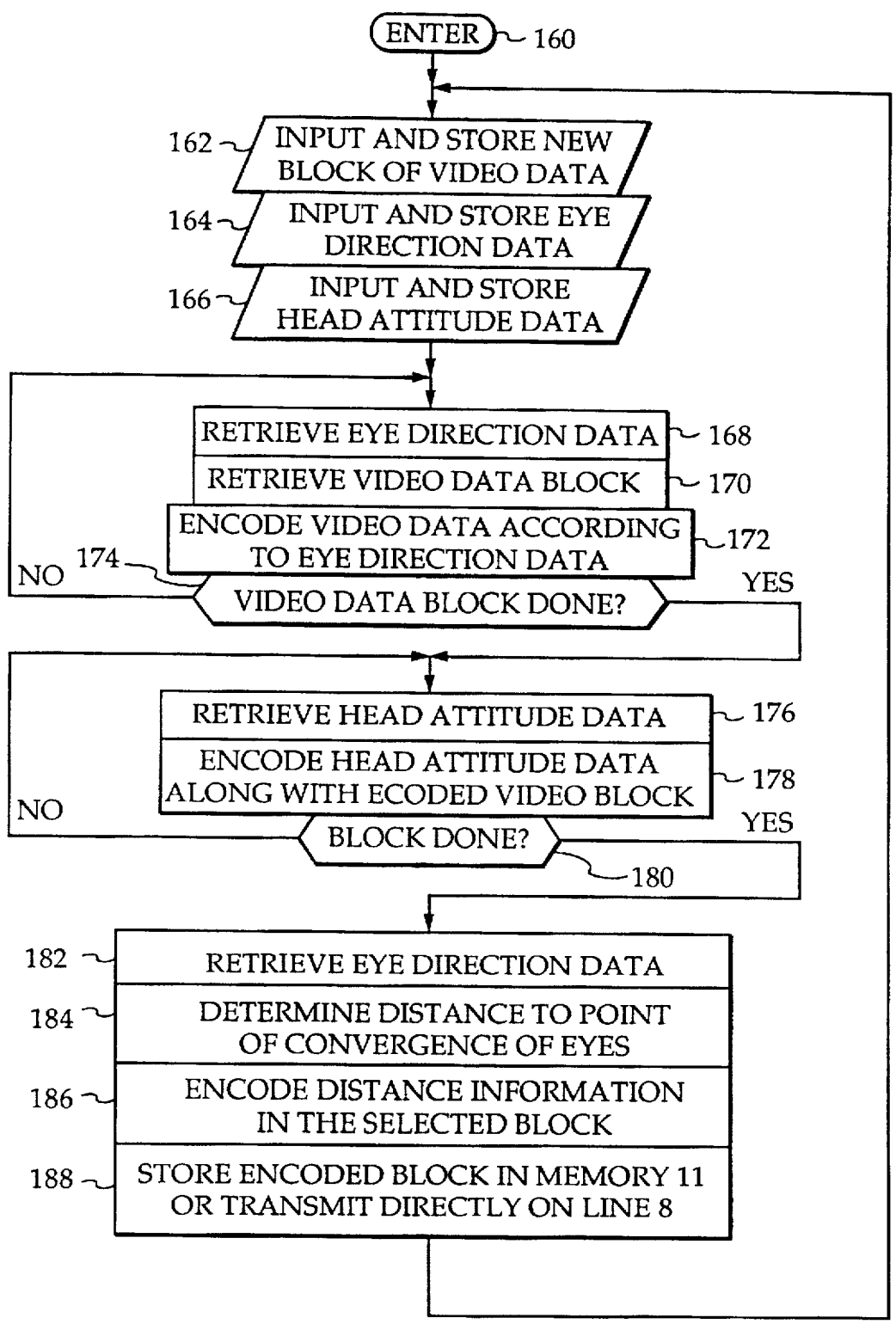
FIG. 3B shows a series of steps that may be carried out in the encoder in the object space for encoding the video, head attitude and eye direction data, according to the invention.

All of the various sensed signals in the object space 1 may be represented as a generalized group of sensed signals on a bundle of lines 11 (see FIGS. 1 & 4) for being encoded in a convenient format in the signal processor or encoder 7 for being provided on the line 8 to the image space 2. Encoding can take place in the encoder 7, for example, as shown in FIG. 3B. After entering in a step 160, a block of a selected size of video data is input and stored in a step 162. A step 164 is next executed to input and store eye direction data from the oculometer sensors 10b, 10c. Head attitude data is next input as indicated in a step 166. Once the sensed head attitude, eye direction and video data is input and stored, a step 168 is then executed in order to retrieve the eye direction data stored in the step 164. Similarly, at least a part of the video data previously stored in the step 162 is retrieved in a step 170. The retrieved video data is then encoded in a step 172 according to the retrieved eye direction data. That if the eye direction signal indicates that the video data to be encoded is in a portion of the overall image that is to be encoded with a higher or lesser degree of resolution, then the encoding is carried out accordingly. A decision step 174 is then executed to determine if the encoding of the video block is done. If not, the steps 168, 170, 172 are again executed until the block is encoded.

As an aside, it should be realized, however, that the eye attitude signal can instead be used to directly control the attitude of a 3-axis platform mounted on the helmet and having a camera with a nonuniform lens mounted thereon which is thereby directed in the same direction as the cameraman's eye. In that case, the optics of the camera effects the desired nonuniform imagery and nonuniform encoding techniques are not needed.

Head attitude data stored previously in the step 166 is next retrieved as indicated in a step 176. The head attitude data is then encoded with at least part of the selected video block as indicated in a step 178. A decision step 180 then determines if the encoding is done. If not, the steps 176, 178 are repeated until it is determined in the step 180 that the block is encoded.

If a variable focal length device such as the device 15a of FIG. 1 is used, a step 182 is executed to retrieve the eye direction data input and stored in step 164. A step 184 is next executed to determine the distance from the monitored eyes to the point of fixation converged upon by the monitored eyes. This information is then encoded in the selected block of data as indicated in a step 186. After that, as indicated in a step 188, the encoded block is stored or transmitted directly to the image space and the step 162 et seq. is executed again.

It should be understood that numerous alternative encoding techniques could be carried out as well including analog techniques using dedicated analog circuitry. Anyone of skill in the art could devise a signal encoding technique for transmitting both the video and control information required in the image space based on the teachings hereof. For instance, the video image may encoded in the conventional analog manner with odd and even raster fields which are interlaced to form a single frame. In that case, several of the horizontal video lines at the top or bottom of a field can be used for encoding the changing pitch, roll and yaw control information. For a given horizontal line used for a control purpose, a selected fixed voltage level between "white" and "black" levels will indicate the delta x, delta y or yaw rotation described in FIGS. 6 and 7 below. Such a control concept is shown for example in FIGS. 2–3 of U.S. Pat. No. 4,513,317 albeit for a different purpose. It should be realized that the encoding technique is not restricted to conventional digital techniques but could take other forms such as, but not limited to, the new HDTV format. It should also be realized that the signal on the line 8 need not be provided directly to the image space 2 but can instead be stored on a mechanical, magnetic, optical, electronic, or the like storage medium 11 for subsequent transfer as indicated on a line 8a for playback on a playback device 12 in the image space. The bundle 11 can take the form of a wire harness connected to the encoder 7 which may be carried by the cameraman in a backpack, for example, along with the storage device 11.

A signal processor or decoder 13 in the image space 2 of FIG. 1 is responsive to the encoded signal on the line 8 either directly (live) from the object space or prerecorded and played back on the playback device 12. The decoder provides decoded image signals on a line 14 to a display control 15 which provides a signal on a line 16 for controlling the display 17 which may be mounted on the helmet 4 which may be monoscopic or stereoscopic, as described previously. The decoder 13 also provides a decoded helmet attitude signal on a line 18 to a helmet attitude control 19 which in turn provides a helmet attitude control signal on a line 20 to a plurality of actuators such as three actuators 21a, 21b, 21c mounted on a stationary plate 22 for actuating the helmet 4 in a corresponding plurality of axes such as three axes, as shown, emulative of the motions of the helmet 3 in the pitch, roll and yaw axes sensed in the object space 1. The attitude control 19 may, e.g., be a simple open loop having proportional plus integral gain. Although not shown, sensors could be provided on the platform 22 to sense position of the plate, for example, for providing feedback signals for a closed loop control. In any event, the control 19 provides actuator command signals on the line 20 for causing the actuators to carryout the control strategy described in connection with FIG. 7 below.

The decoder 13 may also provide a variable magnification control signal on a line 14a to a variable magnification device control 15a which in turn provides a variable magnification device control signal on a line 15b to a variable magnification device (see FIG. 5) associated with the display 17 and as disclosed in more detail in copending applications having Ser. Nos. 08/025,975 and 08/001,736, now U.S. Pat. No. 5,422,653. Of course it should be realized that one or more or even all of the signal processing for the control functions carried out in the image space by the controls 15, 15a, 19 need not be carried out in the image space but could equivalently be carried out in the object space based on raw data transmitted over the line 8. This is of course not the preferred approach, however, since it would be highly uneconomical to replicate such signal processing capabilities in a large plurality of image space receivers and which can instead be carried out more economically on one signal processor in the image space.

The plate 22 may, but need not, be fixedly mounted on a structure (not shown) that, e.g., has fixed structural parts 23 that are indicative of structurally stable parts of a mount for the plate 22 such as an arcade-like booth within which a viewer may be standing or seated for placing the helmet 4 on the viewer's head for inducing head movements of the viewer for passive viewing of images gathered in the object space by the cameraman in the helmet 3. In other words, the seated or standing passive viewer wearing the helmet 4 in the image space 2 is induced to at least emulate pitch, roll and yaw head movements corresponding to the corresponding monitored head movements of the cameraman in the object space, in response to the encoded attitude information in the signal on the line 8, while at the same time watching corresponding images gathered by the cameras 5, 6 also encoded on the line 8 and decoded in the image space for passive viewing.

Figure 5:
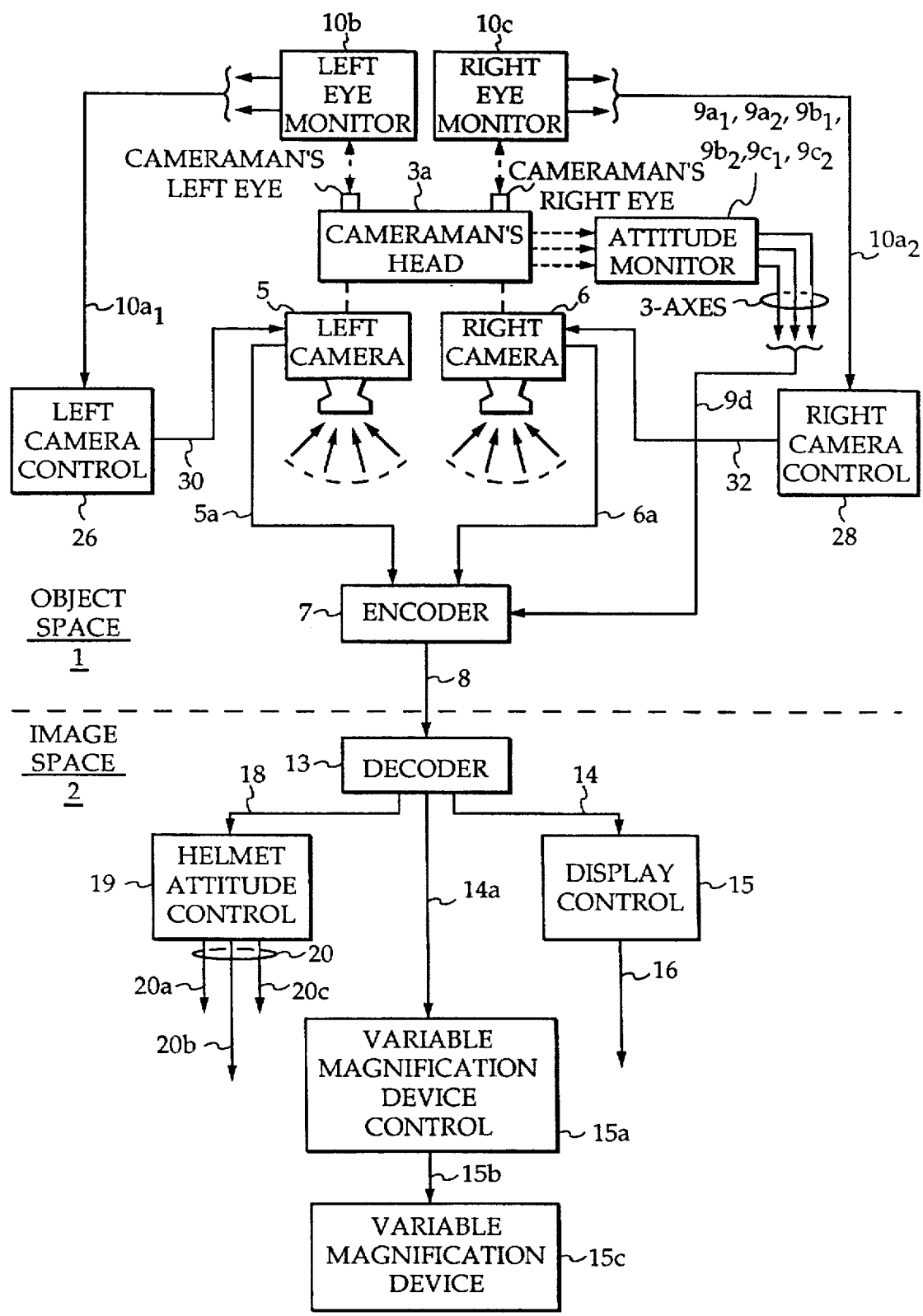
FIG. 5 illustrates aspects of the sensors and encoder of the object space as well as the decoder and controls of the image space in more detail, according to the invention.

FIG. 5 shows in more detail the image acquisition apparatus in the object space 1 of FIG. 1, according to the present invention. The object space 1 of FIG. 5 shows a cameraman's head 3a which may be inserted in the helmet 3 of FIG. 1 and may therefore be considered to have a common coordinate system origin. The cameraman's head is illustrated as having a pair of left and right eyes that are monitored by left and right eye monitors 10b, 10c that provide sensed eye attitude signals on lines $10a_1$, $10a_2$ to respective left and right camera controls 26, 28. These in turn provide camera control signals on lines 30, 32 to the left and right cameras 5, 6, respectively. As mentioned, according to the invention, these control signals may, but need not, be used to control the relative position of a region of image nonuniformity including but not limited to a region of increased resolution, dynamic range, or the like, within each of the images provided to the passive viewer in the image space. Such a region is emulative of the increased sensitivity of the fovea of the particular monitored eye along the visual axis thereof.

Figure 3C:
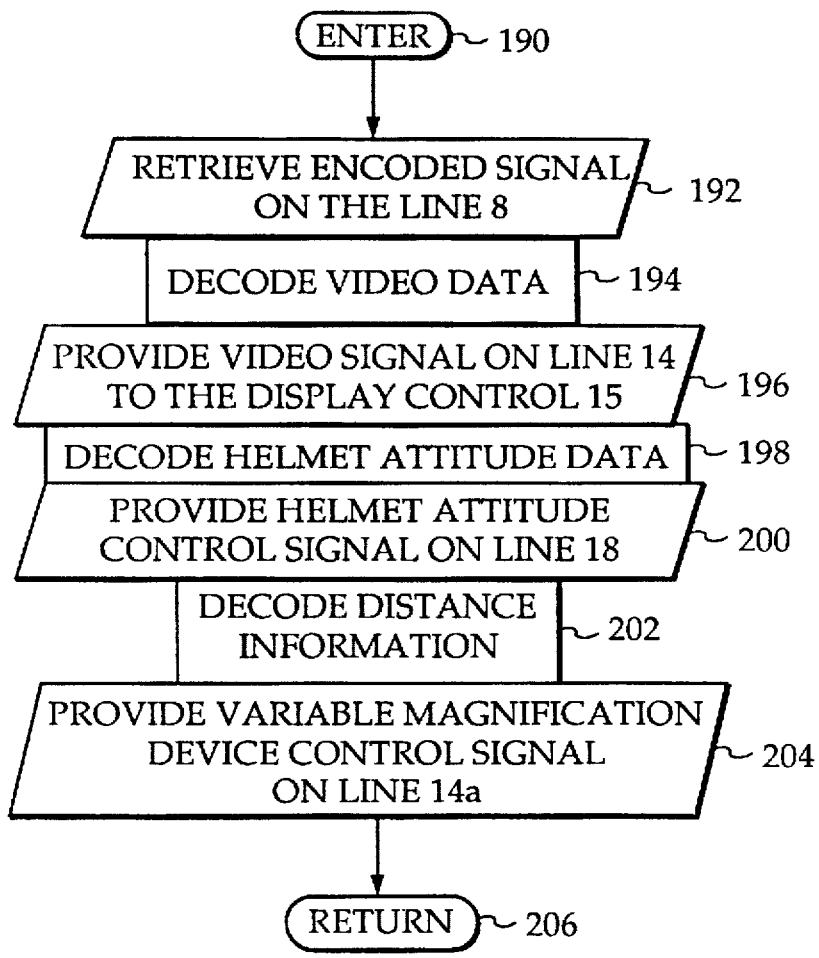
FIG. 3C shows a series of steps that may be carried out in the decode in the image space, according to the invention.

The image space 2 of FIG. 5 is the same as shown in FIG. 1 except also showing a variable magnification device 15c which may be used with the display 17 of FIG. 1 so as to provide images with variable magnification, i.e., at various apparent distances. In other words, the device 15c causes the images from the display 17 to be provided in such a way as to cause the eyes of the viewer to accommodate differently for the various successive images presented thereto. The device 15c may be the same or similar to that shown in copending U.S. patent (application Ser. No. 08/025,975) or in copending U.S. patent application Ser. No. 08/001,736, now U.S. Pat. No. 5,422,653, particularly in connection with FIGS. 3, 5, 6, 17, 19, 20, 21, and 26-35 thereof. FIG. 3C shows a process that may be carried out in the decoder 13 for decoding the signal on the line 8. After entering in a step 190, a step 192 is executed to extract the information encoded on the line 8. The video information may be decoded first, as indicated in a step 194. The video signal on the line 14 is then provided from the decoder 13 to the display control 15. A step 198 may next be executed to decode the helmet attitude data. In a step 200, the helmet attitude control signal on the line 18 is provided. After that, the previously encoded distance information is decoded in a step 202 and the variable magnification device control signal on the line 14a is provided in a step 204. A return is then made in a step 206.

Figure 6A:
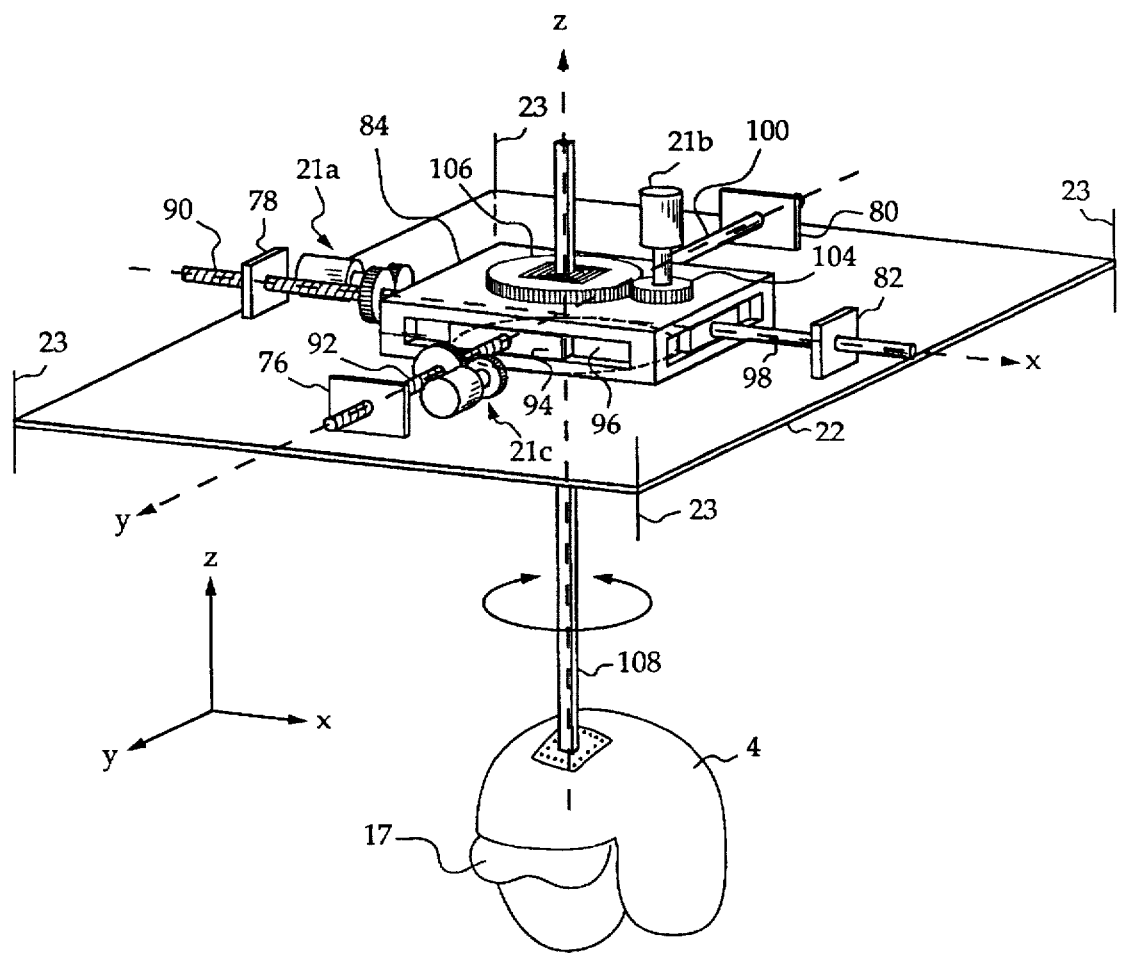
FIG. 6A shows in an expanded view the details of the motion-controlled helmet of the image space of FIG. 1, according to the present invention.

FIG. 6A illustrates the example of a motion-controlled helmet 4 of FIG. 1 in enlarged detail, according to the present invention. A structure (not shown) such as a stationary arcade-type booth or a moving positional and/or attitudinal simulator such as a vehicle simulator, has the platform 22 mounted fixedly within. This embodiment includes a moveable platform 84 mounted on the inside of the not shown structure, e.g., in the inside top part of a booth structure as an extension thereof. The booth may be designed for having the passive viewer standing or seated.

Several pedestals 76, 78, 80, 82 are mounted fixedly on the platform 22. The moveable platform or plate 84 is controlled in the x-y plane by a pair of orthogonal, screw gear drives 21a, 21c corresponding to two actuators of the three actuator embodiment of FIG. 1. The first screw gear drive 21a includes a motor-gear assembly that drives the plate 84 by means of a screw 90 in the plus or minus x-direction. Similarly, the motor-gear assembly 21c drives the plate 84 by means of a screw 92 in the plus or minus y-direction. Mounted perpendicularly at the ends of the screws 90, 92 are slide bars, such as the slide bar 94 shown at the end of the screw 92. The slide bar 94, e.g., is slidably mounted within a slide guide 96 and the screw 92 is attached to a point of the slide bar but can rotate on that point. Similarly, stabilizing rods 98, 100 can be installed on opposite sides of the plate 84 with similar slides in slide guides in axial alignment with corresponding screws 90, 92 in order to give the control a framework within which to push the plate 84 about in the x-y plane.

Figure 6B:
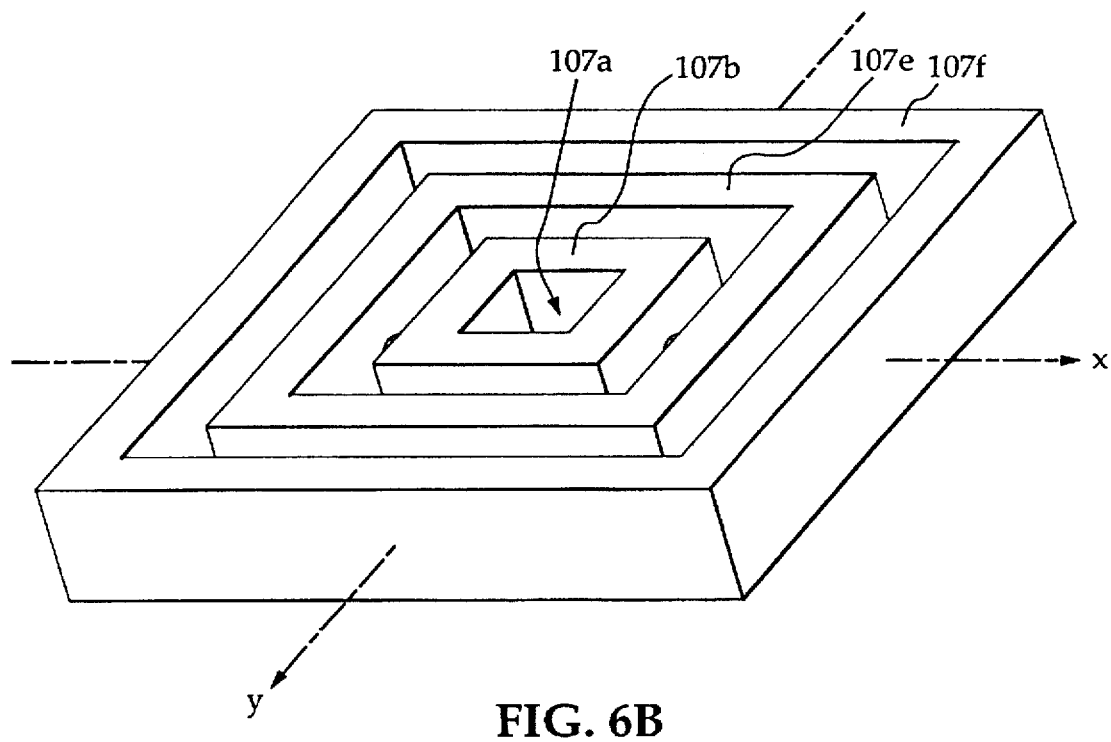
FIG. 6B shows a perspective view of a universal-joint such as may be fixedly mounted within the joint 106 of FIG. 6A.
Figure 6C:
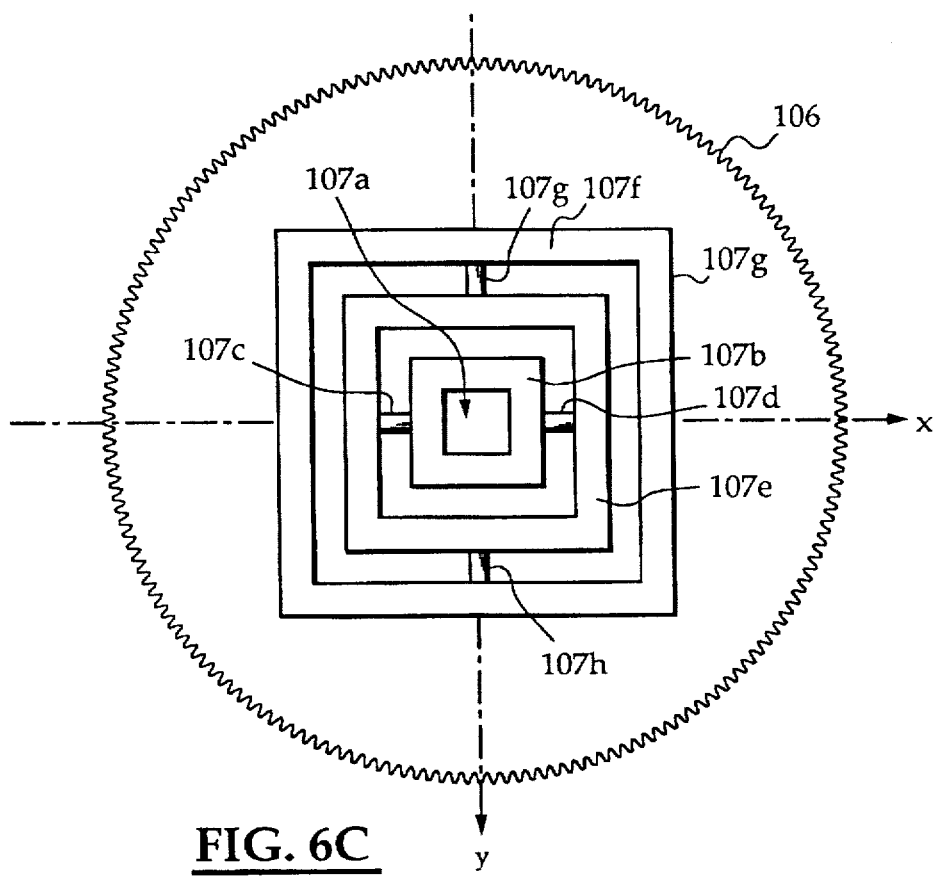
FIG. 6C shows in plan view the U-joint of FIG. 6B within the gear of FIG. 6A.

The third actuator 21b turns a gear 104 that turns another gear 106 that has a universal-joint such as shown in FIG. 6B that has an internal part 107b with a square hole 107a within that accepts a square rod 108 fixed on the helmet 4 for connection thereto, e.g., by slidable insertion therein. The internal part 107b is connected by pins 107c, 107d (see FIG. 6C) to an intermediate part 107e along the x-axis so that the parts 107b and 107e are freely rotatable with respect to each other along the x-axis. The intermediate part 107e is in turn connected to an outer part 107f that has an outside square boundary 107g that fits tightly in a square hole in the gear 106. The intermediate part 107e is connected to the outer part 107f by pins 107g, 107h along the y-axis so that the parts 107e, 107f are freely rotatable with respect to each other about the y-axis.

It will be realized that the illustration of FIG. 6A is for teaching purposes and the motor 21b will have to be fixedly attached in some way, e.g., by a bracket (not shown), to the plate 84. The square rod 108 is connected to the U-joint of FIG. 6B and slides up and down freely through the square hole 107a of the universal joint. Similarly, the rod 108 of the helmet 4 is not shown actually inserted in the universal joint for purposes of clarity. It will also be realized that the universal joint need not take the form shown, since many other u-joints are known, and that even if the form taken is generally the same, the various parts of the universal joint need not be square. The display 17 is shown mounted on the helmet but the display may instead be a panoramic display mounted in a stationary manner with respect to the not shown structure 23. The three actuators 21a, 21b, 21c are separately responsive to corresponding separate components 20a, 20b, 20c of the control signal 20 of FIGS. 1 & 2 for being actuated thereby.

It should be realized that the number of axes of control need not be as extensive or could even be more extensive than that shown, since many simplifications or elaborations are quite possible. It was already indicated above that the it was not desired, for the preferred embodiment, to control position per se. It was preferred to leave the control of head positioning to the viewer himself given that his head's pitch, roll and yaw axes were being so fully constrained. Position was therefore divorced from attitude in the preferred embodiment and only attitude was positively controlled. It should be realized, however, that it would be possible to more positively control position, at least to some degree, i.e., with respect to the fixed referent, such as the arcade booth, by simply adding another actuator to the device of FIG. 6A for retracting or extending the rod 108 (e.g., with teeth added) in or from the U-joint and making some minor modifications thereto. In other words, it should be realized that there are many different ways of connecting an actuator to a passive viewer's head for controlling the movements thereof and the invention is broadly directed to having an apparatus that can be controlled to move the passive viewer's head to allow the viewer to view an image in a manner emulative of a corresponding active viewer's head movements. It should be realized that the sensed attitude signals of FIG. 1 need not be actually sensed but can instead be dictated by a pre-planned program of head movements. It will therefore be understood that the various devices including actuators shown here are merely illustrative of the invention and many other embodiments are within the scope of the claims.

Figure 7:
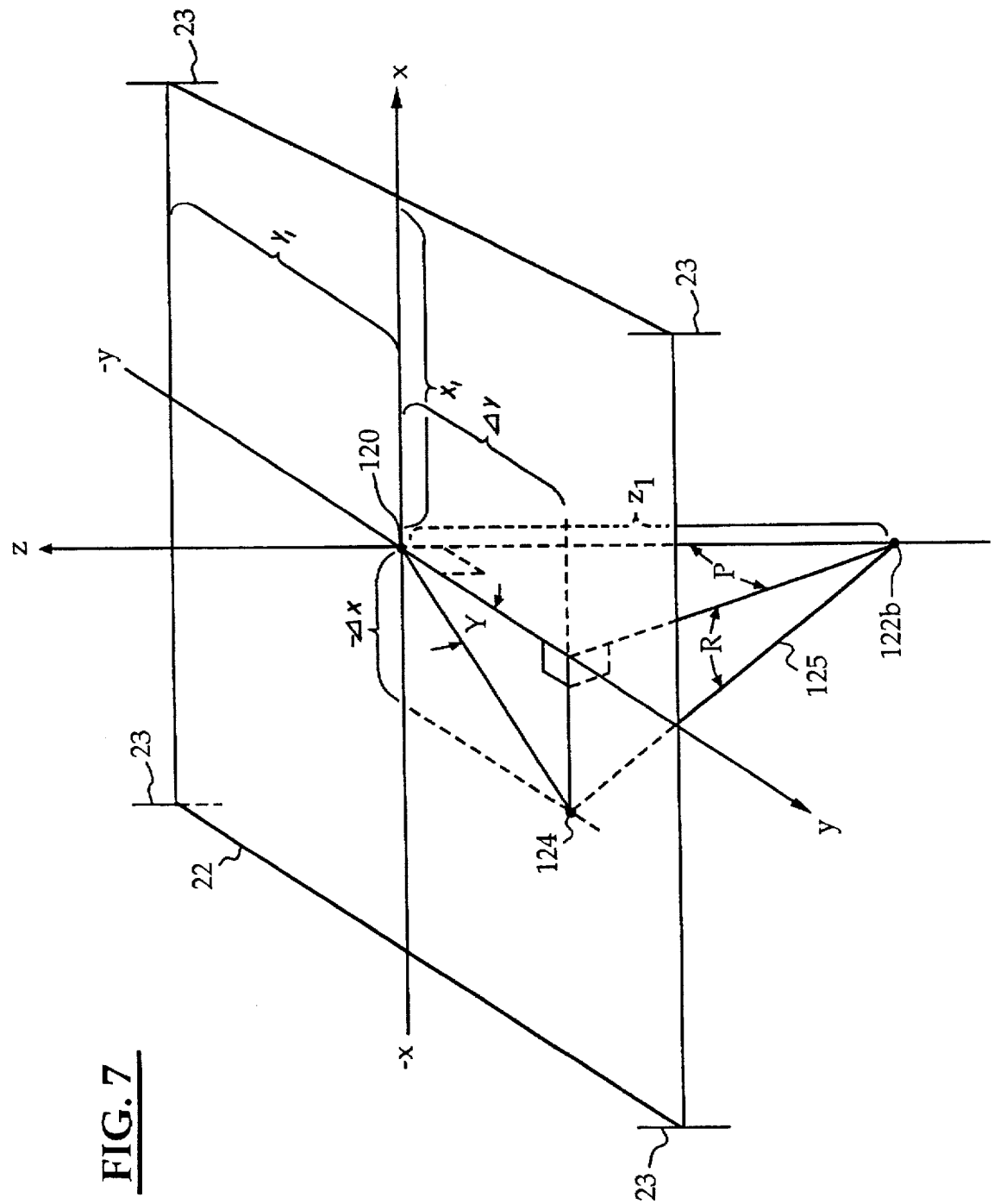
FIG. 7 shows a coordinate system appropriate for the motion-controlled helmet of FIGS. 1 and 6A by means of which the sensed signals in the object space of FIGS. 1, 4, and 5 can be transformed into attitudinal movements of the viewer's head.

With this in mind, an example will now be given of how to use the sensed head attitude signals from the image space to cause the actuators 21a, 21b, 21c to actuate the helmet, using the exemplary actuator of FIGS. 1 and 6A, in such a way as to cause the passive viewer to emulate the corresponding attitudinal head movements of the cameraman. FIG. 7 shows such an example where the platform 22 of FIGS. 1 & 6A is shown with the x, y, z coordinate system of FIG. 6A with its x-y origin 120 so placed as to be centered on the platform. Of course, this is just a convenient place to put it and it could be centered elsewhere as well. A point 122b represents the center of the head of the viewer in the helmet 4 in the image space 2 (see also FIG. 1). It may be assumed for purposes of the example that a distance $z_1$ between the points 120, 122b is constant. This is an approximation good for the case where only three attitudinal axes are positively measured and/or controlled, as in the exemplary embodiment of FIG. 1. It will therefore also be assumed that there is no positional (i.e., translatory) movement of the head origin 122b in the x, y and z directions with respect to the origin 120 and that all the distances $x_1$, $y_1$ and $z_1$ are therefore constant as well. It should be well understood, however, that more or less than three axes may be positively measured and controlled, including translatory position of the head. In the exemplary embodiment, where only head attitude is of interest and is measured in three axes and similarly controlled in those axes, it may be assumed for purposes of approximation, that the origin of the head of the cameraman/viewer is positionally stationary, i.e., is not translating with respect to the origin 120 of the platform 22. However, it should clearly be understood that this may not and need not be the case and that the distances $x_1$, $y_1$, and $z_1$ between the platform 22 and the origin 122 can be positively controlled and used as a parameter in determining the image to be provided to the eyes of the viewer. This of course implies a sensing of a similar parameter in the object space as previously explained in connection with FIG. 3A, for example. This applies to the distances $x_1$ and $y_1$ in the x and y axes separately or equally, as desired.

In any event, it may be assumed for purposes of approximation for the illustrated embodiment that the head origin 122b is positionally immobile and that, as a result, $x_1$, $y_1$, $z_1$ are constant and that the only variables are the sensed pitch, roll, and yaw parameters, as indicated in FIG. 4 by angles P (y-z plane), R(x-z plane) and Y(x-y plane), respectively. It may be assumed for purposes of visualization and convenience of illustration that the not illustrated viewer in a rest or zero position is sitting or standing erect with his head centered and facing in the positive y direction.

If it is desired to move the viewer's head so as to assume a particular pitch and roll attitude, such as dictated by the signals on the line 20 of FIG. 1, the plate 84 of FIG. 6A will be moved into a position so as to position the universal joint in the gear 106 at a particular position such as centered at a position 124 shown in FIG. 7. A shift of minus Δx and positive Δy, as shown, will effect such a change. This will cause the rod 108 to be aligned along an axis 125 intersecting the points 122 and 124 and the viewer's head will assume the desired pitch and roll attitude at particular pitch and roll angles P, R. Trigonometry can be used to calculate the Δx and Δy movements that will result in the desired pitch and roll angles. For example, if the P angle is determined in the step 52 of FIG. 3, as previously described, the step 53 calculates the Δy needed to obtain the desired P angle based on the fixed distance $z_1$ and the desired angle P. I.e., Δy=$z_1$tanP. The actuator 21c of FIG. 6 then causes the platform 84 to move in the positive y direction by the calculated length Δy.

Corresponding to the method of FIG. 3A for the pitch axis, it will be realized that the method of FIG. 3A can be adapted to apply as well to the roll axis. The illustrated roll angle R is obtained, e.g., by a negative Δx translation of (Δy)(tanR)/(sinP) or, equivalently, Δx=$z_1$tanR. The actuator 21a of FIG. 6A may then be used to move the platform a distance of Δx in the negative direction.

The third degree of freedom, i.e, the yaw axis may be controlled directly by means of the actuator 21b of FIG. 6A. By turning the gear 104, the gear 106 and the universal joint within are rotated by the angle Y and the head of the passive viewer is accordingly rotated by the angle Y.

Upon forced movement by the apparatus of FIGS. 6A & 7, for the illustrated embodiment, the viewer's head need not stay precisely centered or positioned at point 122b as this is just an approximation. The attitudinal changes of the viewer's head forced by the apparatus of FIGS. 6A & 7 will naturally be accompanied by some small translatory movements due to the interaction of the head, neck, and body of the viewer even though the body be relatively stationary. In other words, the rod 108 is able to slide within the U-joint and the viewer can have some control over the translatory position of his head along the axis of the rod 108. Nevertheless, other embodiments are possible in which the passive viewer's head position is more precisely controlled.

Similarly, it will of course be realized that the known principles of transformation of coordinate systems may be employed to transform and translate the sensed signals in the object space of FIG. 1 into the coordinate system of FIG. 7, as desired.

It should also be understood that the attitude control signals on the line 20 of FIG. 1 change from time to time to cause the viewer's head to assume various different attitudes. At the same time, it should be understood, correspondingly different attitudinal views of the depicted scene are presented on the display 17 so as to provide a harmoniously changing viewpoint for the passive viewer. These different views may be provided by the cameras 5, 6 on the cameraman's head but can be generated by other means such as animation or computer generated imagery.

As mentioned above, in connection with FIGS. 1 & 5, the signal processor or encoder 7 receives at least one video signal from at least one camera and, in the embodiment illustrated, receives two video signals 5a, 6a from left and right video cameras 5, 6 to provide a stereoscopic video signal to the image space. These signals that are encoded by the signal processor or encoder 7 may be provided to the decoder 13 in the image space 2 so as to provide the viewer with stereoscopic images of the object space. These may be provided by separate displays, one for each eye, or may be provided by the same display alternately, using light shutters, as known in the art of stereo television.

As described above, the viewer can be drawn even more deeply into the experience of the cameraman (or a computer generated version thereof) by having his visual axes induced to emulate those of the cameraman. This is not necessary but represents an enhancement of the invention. This is done by monitoring the visual axes of one or more eyes of the cameraman in order to determine the direction of his gaze. That information is then used to produce each image in such a way that it has nonuniform informational content over its expanse. In other words, a portion of each image will have more or differently presented informational content concentrated or highlighted therein, in order to draw the attention of the viewer thereto. The particular portion of each successive image that has this extra level of informational content or highlighting will be changed between successive images such that it moves about within the field of view of the viewer according to the direction of the cameraman's gaze within his field of view and the passive viewer's eyes will naturally move about in emulation thereof. This sort of a passive viewing of an image nonuniformity, e.g., of a high concentration portion of the image is disclosed in detail in copending U.S. Pat. No. (U.S. Ser. No. 08/001,736).

As also mentioned, FIG. 5 shows a pair of eye monitors 10b, 10c that provide sensed signals on the lines $10a_1$, $10a_2$ to left and right camera controls 26, 28 which in turn provide left and right camera control signals on the lines 30, 32 for controlling the image nonuniformity or high informational content portion of the respective image signals on the lines 5a, 6a.

The nature of the nonuniform images can be selected according to the demands of a given application and need not be of any particular type. They may be of the type shown, for example, in U.S. Pat. No. 3,953,111 by a non-linear lens or as shown in U.S. Pat. Nos. 4,028,725 or 4,405,943 or 4,513,317 (see FIGS. 2, 3 & 4 in particular) or 3,507,988 or as shown in the above mentioned copending application U.S. Ser. No. 08/001,736 (nonuniform resolution) or as described below by images having nonuniform dynamic range for the individual pixels therein. Nonuniform resolution images may be provided in analog or digital fashion as described in the copending U.S. patent application Ser. No. 08/001,736 in connection with FIGS. 7(a), 7(b), 8–12, 13(a)–(c), and 14 and as described in the accompanying text thereof beginning at page 29, line 3 through page 51, line 14 which is hereby expressly incorporated by reference. Similarly, a nonuniform dynamic range technique may be used in lieu of nonuniform resolution, particularly for digital embodiments. In such a case, a small group of pixels within the total picture are selected to be sensed and/or encoded with a greater number of levels or shades of gray than the larger remainder portion of the total picture. For these pixels, more digital bits are used so as to achieve the greater number of levels. The position of the small group within the total image may be moved as between successive images or within a single image according to the cameraman's monitored eye movements within the cameraman's field of view. To carry out the nonuniform imagery, regardless of type, all that is required is that the portion of each successive image that contains the nonuniformity content be presented in such a way as to draw the attention of the viewer's gaze so that the nonuniform portion falls on the viewer's fovea.

Figure 8:
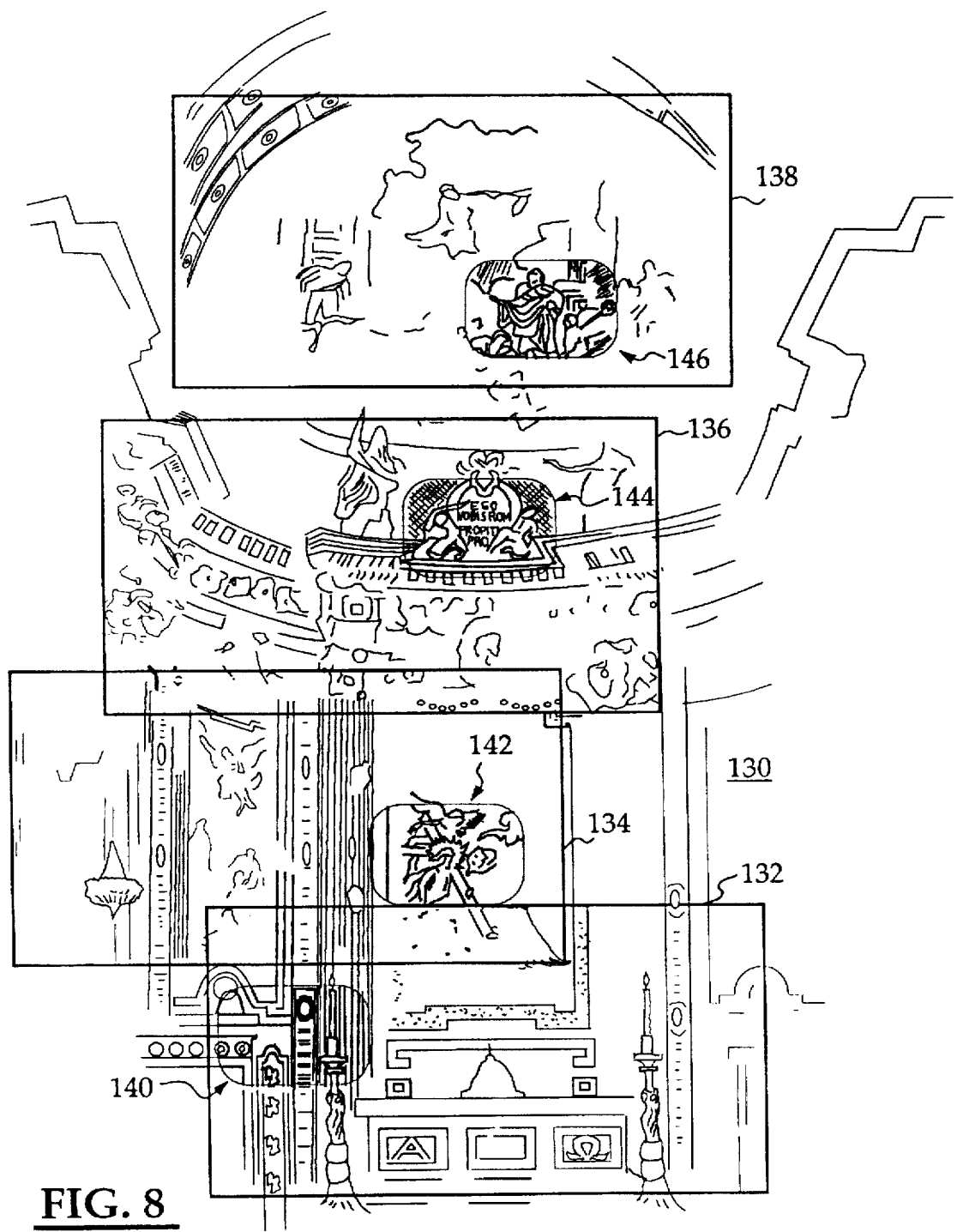
FIG. 8 shows a series of monocular images gathered by a cameraman in an object space for presentation to a passive viewer as nonuniform images, according to the invention.

For example, FIG. 8 shows an object space 130 comprising the interior of a church. A cameraman such as the cameraman of FIGS. 1 and 5 is located in the object space 130 with a helmet for gathering monocular or stereoscopic images. Assuming the cameraman is seated in the church, as the cameraman moves his head to look about by making attitudinal (pitch, roll, and yaw) changes, the camera or cameras pick up the images 132, 134, 136, 138 shown over a short period, e.g., a second or two more or less. It may be assumed that for the first image 132, the cameraman is seated, with his head level and pointing straight ahead, e.g., pointing in the +y direction of FIG. 7. Due to the attitude monitors of FIG. 1 and the control signals developed therefrom as explained in connection with FIG. 3A, the display apparatus in the image space will also be oriented so as to cause the passive viewer's head to be similarly oriented so as to see the same image 132 with his head in the same attitude as that of the cameraman.

In the particular instance illustrated, for the acquired image 132, the cameraman's visual axis is not directed straight ahead but off to the left as monitored by the oculometer 10 of FIG. 1 or FIG. 5. As a result, the displayed image has a small area 140 that has higher image informational content than the rest of the image which is shown with fainter lines to indicate a lesser degree of image informational content. It may be of higher resolution, dynamic range, or the like. The passive viewer's visual axis is naturally drawn to be directed on the area 140 for viewing by the fovea of the passive viewer's eye. As a result, the viewer emulates not only the head movements of the cameraman but also his eye movements.

The cameraman next moves his head up and to the left, i.e., executes a clockwise movement (pitch) in the y-z plane and a counterclockwise (viewed from above) movement (yaw) in the y-x plane of FIG. 7. The acquired image 134 is the result. It will be observed that the cameraman's visual axis has changed its point of attention within the object space to a small area 142 on a lower right hand side of "his" field of view. The display apparatus in the image space of FIG. 1 will cause the passive viewer to execute similar attitudinal head movements. Similarly, the passive viewer's eyes are naturally drawn to the small area 142 for viewing by the fovea of the passive viewer's eye.

The cameraman next moves his head up and to the right, i.e., executes a clockwise movement (pitch) in the y-z plane and a clockwise movement (yaw) in the y-x plane and acquires the image 136. The cameraman's visual axis in this case is still directed to the right but slightly above to a small area 144 of higher image informational content. The display apparatus in the image space of FIG. 1 will cause the passive viewer to execute similar attitudinal head movements. Similarly, the passive viewer's eyes are naturally drawn to a small area 144 for viewing by the fovea of the passive viewer's eye.

Finally, the cameraman next moves his head further up and to the right, i.e., executes a clockwise movement (pitch) in the y-z plane and a clockwise movement (yaw) in the y-x plane and acquires the image 138. The cameraman's visual axis in this case is still directed to the right but slightly down to a small area 146 of higher image informational content. The display apparatus in the image space of FIG. 1 will cause the passive viewer to execute similar attitudinal head movements. Similarly, the passive viewer's eyes are naturally drawn to the small area 146 for viewing by the fovea of the passive viewer's eye.

Although no roll movements (in the x-z plane) have been illustrated (as a tilt) in FIG. 8, such are of course contemplated, according to the invention. It should be realized that the images gathered in the object space and presented in the image space succeed each other at a very rapid rate, e.g., 30, 60 or even more frames per second. Thus, for the illustration of FIG. 8 there will likely be a multitude of images presented beyond the few shown so that the sequence is smoother than indicated.

As already indicated in connection with FIG. 1, the images gathered in the object space may be stereoscopic. Such may be presented by the display in the image space of FIG. 1 in any convenient stereoscopic format of uniform or nonuniform resolution presentation. For a narrow field of view such as shown in FIG. 8 (e.g., on the order of 30–45 degrees) the stereopair images are completely overlapped and still only cover half of the full 90 degrees of binocular vision of the human visual process.

However, as shown in copending application U.S. Ser. No. 08/1,736, a stereopair may be overlapped as described at page 57, line 6 through page 63, line 20 and as shown in FIGS. 17 and 18(a)–(d) with separate very narrow field of view areas of high image informational content in the separate left and right views coinciding and moving about together within an area of binocular overlap. Such an approach is particularly appropriate where an overall very wide field of view is presented, e.g., wider than 90 degrees, i.e., where the areas outside 90 degrees are monocular, in imitation of the human field of view. Such wide angle images can be acquired with a high degree of detail over the full field of view of the human visual apparatus using an array of image sensor modules such as shown in U.S. Pat. No. 4,323,925.

Figure 9:
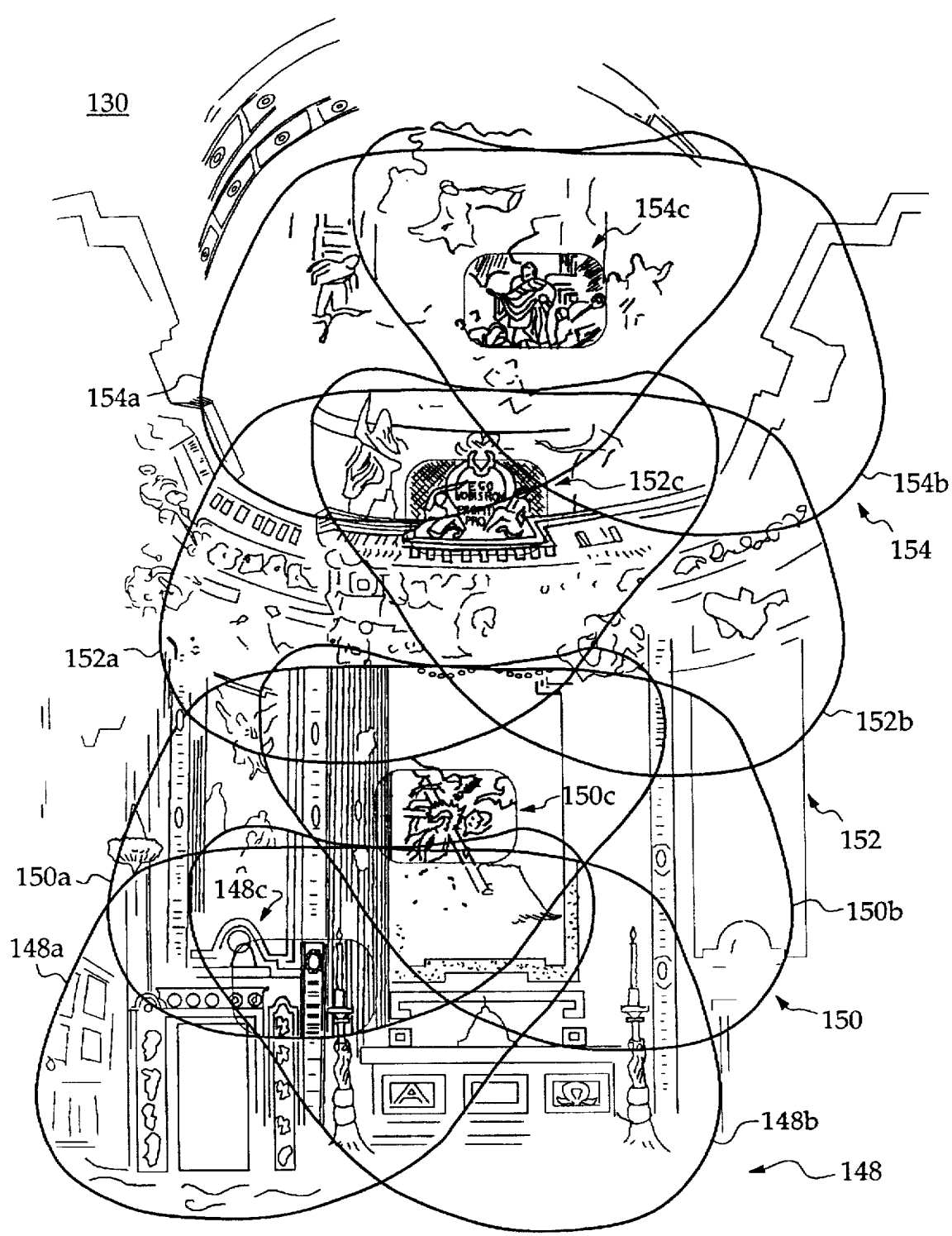
FIG. 9 shows a series of stereo images similar to those of FIG. 8, according to the invention.

For example, as shown in FIG. 9, a sequence of four stereoscopic images 148, 150, 152, 154 similar to the sequence of FIG. 8 are shown, each comprising corresponding overlapping left and right halves 148a, 148b; 150a, 150b; 152a, 152b; 154a, 154b. Each half represents the field of view of a respective left or right eye. Each can have a horizontal field of view of as wide as 140 degrees, approximately corresponding to the full human monocular field. An inverted triangular shaped area of overlap of each pair is viewed stereoscopically, i.e., binocularly and can be as wide as 90 degrees horizontally corresponding to the full horizontal extent of human binocular overlap. As in FIG. 8, the images sequence from the bottom to top of the Figure with an accompanying sequence of head movements. Within each triangular shaped area of binocular overlap in each pair are two overlapping areas of high concentration image information 148c, 150c, 152c, 154c. Since these are overlapping in the Figure, they appear as one. They are similar to those shown in FIG. 8 except for being indicative of binocular foveal fusion.

Figure 10:
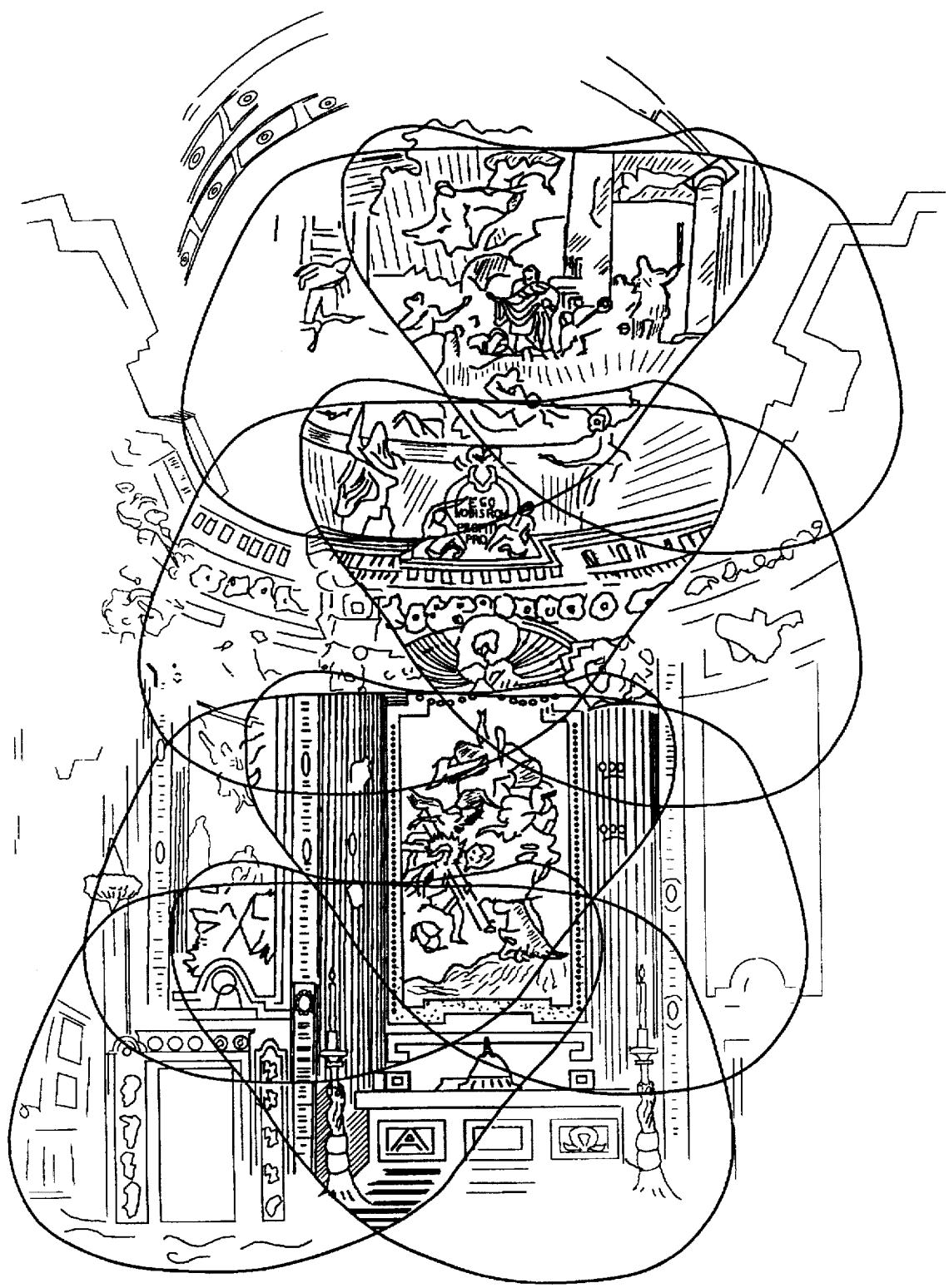
FIG. 10 shows a series of stereo image pairs similar to those of FIGS. 8 and 9 that achieves high resolution binocular viewing, except without a need for eye tracking in the object space, according to the invention.

It may be the case that eye tracking in the object space is not desired but that an emphasis of the binocular area of overlap is nonetheless wanted. In that case the area of high resolution emphasis can be enlarged, e.g., as shown in FIG. 10 to cover the entire area of binocular overlap in a sequence similar to those shown in FIGS. 8 & 9. In such a case, no matter where the viewer chooses to fixate within the binocular overlap area he will view the imagery with a high level of resolution. Similarly, a central, fixed area of each of the images FIG. 8 could be rendered with higher informational content or highlighted.

As already suggested above, it may also be useful to provide the image to the viewer at various apparent distances as shown for example in copending application U.S. Ser. No. 08/25,975 at page 6, line 25 through page 32, line 10 by means of a variable magnification device such as shown (but not limited to) in copending application having U.S. Ser. No. 08/1,736 at page 24, line 23 through page 29, line 2 in connection with FIGS. 3–6 thereof, and at page 70, line 11 through page 72, line 2 in connection with FIGS. 26–35 thereof, all of which is hereby expressly incorporated by reference.

In connection with any of these various types of images, it may be desired to present the images to the eyes of the viewer at various apparent distances in such a way as to preserve a selected relationship such as, but not necessarily, a normal relationship between accommodation and convergence in the eyes of the viewer. Such is shown, for example, beginning with FIG. 19 and as described beginning at page 63, line 21 through page 68, line 8 and in further connection with FIGS. 20–22 of the above mentioned U.S. Ser. No. 08/1,736 which is incorporated by reference.

The helmet mounted display of the image space of FIG. 1 can take the form as shown, for example, in FIGS. 23–25 of U.S. patent application Ser. No. 08/1,736 as described beginning at page 68, line 9 through page 70, line 10 which is incorporated by reference.

Similarly, although not disclosed herein, it should be realized that an audio component of the video signal on the line 46 may be provided as well by placing microphones in the object space such as positioned in strategic locations on the cameraman's head. Similarly, speakers may be provided in the image space and located in analogous positions about the head of the viewer for receiving decoded audio signals from the decoder. I.e., the speakers may be placed strategically about the helmet for reproducing sound as if from three dimensions as heard by the cameraman. Such is shown in detail in (copending application Ser. No. 08/1,736) U.S. Pat. No. (Atty. Docket No. 313-002) at col. (page 52), line (18) through col. (page 57, line (5) in connection with FIG. 16 and at col. (page 68), line (14) through col. (page 69), line (7) in connection with FIG. 23, all of which is hereby expressly incorporated by reference.

Similarly, although the invention has been shown and described with respect to a best mode embodiment thereof, it should be understood by those skilled in the art that various changes, omissions and deletions in the form and detail of the foregoing may be made therein without departing from the spirit and scope of the invention.

I claim:

1. Apparatus, comprising:
    a camera for mounting on a head of a cameraman, responsive to light reflected from objects in an object space, for providing an image signal indicative of the objects viewed by the cameraman;
    a head attitude monitor, responsive to an attitude of the head of the cameraman, for providing an attitude signal indicative of attitudinal head motions of the head of the cameraman as the objects are viewed by the cameraman; and
    a video and head motion signal processor, responsive to the image signal and to the attitude signal, for providing an encoded signal for decoding in an image space for controlling attitudinal head motions of a passive viewer in the image space corresponding to the attitudinal head motions of the head of the cameraman and for providing images of the objects to the passive viewer corresponding to the objects viewed by the cameraman.

2. The apparatus of claim 1, further comprising:
    an eye monitor, responsive to attitudinal movements of an eye in the head of the cameraman, for providing an eye attitude signal indicative of direction of a visual axis of the cameraman and wherein the video and head motion signal processor further comprises:

a camera control, responsive to the eye attitude signal, for providing an image control signal; and means responsive to the image control signal for providing the image signal with nonuniform informational content indicative of the direction of the visual axis of the cameraman for inducing attitudinal eye movements of the passive viewer emulative of the eye movements of the cameraman.

3. The apparatus of claim 1, further comprising, in the image space:

a video and motion control decoder, responsive to the encoded signal, for providing a helmet control signal and a decoded video signal;

a helmet connected to a helmet actuator for mounting on a head of the passive viewer, wherein the actuator is responsive to the helmet control signal, for causing the helmet to execute attitudinal movements emulative of the attitude of the head of the cameraman; and a display, responsive to the decoded video signal, for providing images for viewing from within the helmet for viewing by the passive viewer.

4. The apparatus of claim 3, further comprising, in the image space:

at least one variable magnification device, responsive to said images and to a variable magnification control signal, for providing a control signal for changing the apparent distances of said images for viewing by the passive viewer with correspondingly varying accommodation.

5. Apparatus, comprising:

a video and head motion control decoder, responsive to an encoded video and head motion signal, for providing a decoded helmet control signal and a decoded video signal;

a helmet connected to a helmet actuator, wherein the actuator is responsive to the decoded helmet control signal, for causing the helmet to execute attitudinal movements; and a display, responsive to the decoded video signal, for providing images for viewing from the helmet.

6. The apparatus of claim 5, wherein the encoded and decoded video signals contain image information for providing successive images having a portion with high informational content and a portion with low informational content and wherein the portion with high informational content changes position within the successive images for foveal viewing from the helmet.

7. The apparatus of claim 5, further comprising:

a variable magnification device, responsive to said images and to a variable magnification control signal, for changing the apparent distances of said images.

8. The apparatus of claim 6, further comprising:

a variable magnification device, responsive to said images and to a variable magnification control signal, for changing the apparent distances of said images.

9. Apparatus, comprising:

a head motion and video control decoder, responsive to an encoded signal, for providing a decoded helmet control signal and a decoded video signal;

a viewer helmet connected to a helmet actuator, wherein the actuator is responsive to the decoded helmet control signal, for causing the helmet to execute movements; and a display, responsive to the decoded video signal, for providing images for viewing from the helmet.

10. The apparatus of claim 9, wherein the encoded and decoded video signals contain image information for providing successive images having a portion with high informational content and a portion with low informational content and wherein the portion with high informational content changes position within the successive images for foveal viewing from the helmet.

11. The apparatus of claim 9, further comprising:

a variable magnification device, responsive to said images and to a variable magnification control signal, for changing the apparent distances of said images.

12. The apparatus of claim 10, further comprising:

a variable magnification device, responsive to said images and to a variable magnification control signal, for changing the apparent distances of said images.

* * * * *